US012803889B2

(12) United States Patent
Luo

(10) Patent No.: US 12,803,889 B2
(45) Date of Patent: Nov. 17, 2026

(54) INTELLIGENT RADIO INFORMATION EXPOSURE METHOD AND APPARATUS, AND SYSTEM, AND STORAGE MEDIUM

(71) Applicant: DATANG MOBILE COMMUNICATIONS EQUIPMENT CO., LTD., Beijing (CN)

(72) Inventor: Zhangyu Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 53 days.

(21) Appl. No.: 19/107,559

(22) PCT Filed: Aug. 7, 2023

(86) PCT No.: PCT/CN2023/111566

§ 371 (c)(1),
(2) Date: Feb. 27, 2025

(87) PCT Pub. No.: WO2024/046044

PCT Pub. Date: Mar. 7, 2024

(65) Prior Publication Data

US 2026/0254733 A1 Aug. 27, 2026

(30) Foreign Application Priority Data

Sep. 2, 2022 (CN) ......................... 202211072419.9

(51) Int. Cl.
*H04L 41/5054* (2022.01)
*H04L 67/30* (2022.01)

(52) U.S. Cl.
CPC .......... *H04L 41/5054* (2013.01); *H04L 67/30* (2013.01)

(58) Field of Classification Search
None
See application file for complete search history.

(56) References Cited

U.S. PATENT DOCUMENTS 12,061,887 B2 * 8/2024 Pontecorvi ................ H04L 9/50
12,316,579 B2 * 5/2025 Wang .................... H04L 5/0098
12,413,653 B1 * 9/2025 Yi ......................... H04L 69/161
(Continued)

FOREIGN PATENT DOCUMENTS

CN 113365287 A 9/2021
CN 113498076 A 10/2021
(Continued)

OTHER PUBLICATIONS

ISA State Intellectual Property Office of the People's Republic of China, International Search Report and written opinion Issued in Application No. PCT/CN2023/111566, Oct. 20, 2023, WIPO, 13 pages.

(Continued)

*Primary Examiner* — Backhean Tiv
(74) *Attorney, Agent, or Firm* — KILPATRICK TOWNSEND & STOCKTON LLP

(57) ABSTRACT

The present disclosure provides an intelligent radio information exposure method and apparatus, and a system, and a storage medium. The method includes: an intelligent radio exposure sub-system sending an exposure activation request to at least one extended application; obtaining an activation result fed back by each extended application, where the activation result is determined by the extended application according to current operating information of the extended application itself, the activation result includes activation success or activation failure, and the operating information includes at least one of the following: startup status information of a corresponding function of the extended application itself, load information produced from startup of the function in the extended application, or integrated extraction constraint information; and establishing an intelligent radio information exposure context between the intelligent radio (Continued)

exposure sub-system and the extended application in a case that the activation result is activation success.

20 Claims, 6 Drawing Sheets

(56) References Cited

U.S. PATENT DOCUMENTS

| | | | | |
|---|---|---|---|---|
| 2021/0234803 | A1 | 7/2021 | Parekh et al. | |
| 2021/0258866 | A1 | 8/2021 | Chou | |
| 2021/0377804 | A1* | 12/2021 | Sivaraj | H04W 76/15 |
| 2023/0412608 | A1* | 12/2023 | Vaishnavi | H04L 63/102 |
| 2024/0111594 | A1* | 4/2024 | Ravindran | G06F 9/5044 |
| 2024/0179577 | A1* | 5/2024 | Porras | H04W 28/24 |
| 2024/0291629 | A1* | 8/2024 | Tehrani | H04L 5/001 |
| 2026/0143363 | A1* | 5/2026 | Verma | H04L 41/0873 |

FOREIGN PATENT DOCUMENTS

| | | | |
|---|---|---|---|
| CN | 114080016 | A | 2/2022 |
| CN | 114189893 | A | 3/2022 |
| CN | 114630265 | A | 6/2022 |
| CN | 115884264 | A | 3/2023 |
| WO | 2022046756 | A1 | 3/2022 |
| WO | 2022053933 | A1 | 3/2022 |
| WO | 2022182396 | A1 | 9/2022 |

OTHER PUBLICATIONS

O-RAN Alliance,"O-RAN Working Group 3 Near-Real-time RAN Intelligent Controller E2 Service Model (E2SM), RAN Function Network Interface (NI)", ORAN-WG3.E2SM-NI-v01.00.00, Feb. 29, 2020.

The extended European search report received in the counterpart European Application 23859079.8, mailed on Jun. 23, 2026.

The Notice of Allowance and Search Report issued in Chinese corresponding application 202211072419.9, mailed on Jul. 10, 2026.

O-RAN Alliance, "LS on O-RAN Alliance & 3GPP Coordination on O-RAN Alliance Outputs", 3GPP TSG RAN Meeting #85, Newport Beach, USA, Sep. 16-20, 2019, total 3 pages, RP-192259.

* cited by examiner

INTELLIGENT RADIO INFORMATION EXPOSURE METHOD AND APPARATUS, AND SYSTEM, AND STORAGE MEDIUM

CROSS-REFERENCE TO RELATED APPLICATIONS

The present disclosure is a National Stage of International Application No. PCT/CN2023/111566, filed on Aug. 7, 2023, which claims priority to Chinese Patent Application No. 202211072419.9, entitled "INTELLIGENT RADIO INFORMATION EXPOSURE METHOD AND APPARATUS, AND SYSTEM, AND STORAGE MEDIUM" and filed with the China National Intellectual Property Administration on Sep. 2, 2022. These applications are hereby incorporated by reference in their entireties.

FIELD

The present disclosure relates to the field of communication technologies, and more specifically, to an intelligent radio information exposure method and apparatus, and a system, and a storage medium.

BACKGROUND

In an open radio access network (O-RAN for short), a near real-time radio access network intelligent controller (near real-time RAN intelligent controller, Near-RT RIC for short) obtains, from a Non-RT RIC, auxiliary information (A1 Enrichment Information, A1-EI for short) for intelligent processing, obtains radio information from a radio access network (RAN for short), and then performs intelligent processing to finally obtain signaling and policies and the like used for guiding RAN behaviors.

The Near-RT RIC has an intelligent processing capability through which it can not only generate signaling and policies and the like to guide the RAN behaviors but also generate intelligent radio information for non-RAN information devices such as service servers and core network NWDAFs (network data analytic functions) as a basis for service adjustment and a radio input for global network analysis.

Therefore, how to expose the intelligent radio information generated by the Near-RT RIC has become an urgent problem to be solved.

SUMMARY

The present disclosure provides an intelligent radio information exposure method and apparatus, and a system, and a storage medium, for achieving exposure of intelligent radio information.

In one embodiment of the present disclosure provides an intelligent radio information exposure method, applied to an intelligent radio exposure sub-system, including:

- sending an exposure activation request to at least one extended application;
- obtaining an activation result fed back by each extended application, where the activation result is determined by the extended application according to current operating information of the extended application itself, the activation result includes activation success or activation failure, and the operating information includes at least one of the following: startup status information of a corresponding function of the extended application itself, load information produced from startup of the function in the extended application, or integrated extraction constraint information;
- establishing, when the activation result is activation success, an intelligent radio information exposure context between the intelligent radio exposure sub-system and the extended application, where the establishing the intelligent radio information exposure context is used to characterize establishment of a connection between the intelligent radio exposure sub-system and the extended application.

According to the intelligent radio exposure method provided by the present disclosure, the exposure activation request is sent to the at least one extended application, when the activation result of activation success is obtained, the intelligent radio information exposure context can be established with the extended application, and the intelligent radio information generated by the at least one extended application can be obtained based on the intelligent radio information exposure context, and then provided to the external device, thereby realizing the exposure of the intelligent radio information.

In one embodiment, the exposure activation request at least includes an identification of the intelligent radio information exposure context, an identification of intelligent radio information required to be exposed, or required provision timing of intelligent radio information;

or,

- the exposure activation request at least includes at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system;
- where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, in a case that the activation result is activation failure, the activation result includes failure indication information and/or a reason for the activation failure.

In one embodiment, before sending the exposure activation request to the at least one extended application, the method further includes:

- obtaining an application exposure profile sent by each extended application;
- performing a storage operation for the application exposure profile sent by each extended application; and where the performing the storage operation for the application exposure profile sent by each extended application includes:

for each extended application, using, if it is detected that there is a stored exposure profile corresponding to the extended application, the obtained application exposure profile to overwrite the stored exposure profile.

In one embodiment, the application exposure profile at least includes an identification of the extended application, an identification of output information of the extended application, and a format of output information of the extended application;

or, the application exposure profile at least includes at least one of the following items: an identification of the extended application, and an identification of output information of the extended application, a format of output information of the extended application, an identification of intermediate output information of the extended application, a format of intermediate output information of the extended application, usage status of the extended application, a system requirement of the extended application, and a storage space occupied by the extended application.

In one embodiment, the method further includes:

sending an exposure update request to the at least one extended application;

obtaining an update result fed back by each extended application, where the update result is determined by the extended application according to current operating information of the extended application itself, the update result includes update success or update failure, and the operating information includes at least one of the following: startup status information of a corresponding function of the extended application itself, load information produced from startup of the function in the extended application, or integrated extraction constraint information;

when the update result is update success, updating the intelligent radio information exposure context between the intelligent radio exposure sub-system and the extended application.

In one embodiment, the exposure update request at least includes an identification of the intelligent radio information exposure context, an updated provision manner of intelligent radio information, or updated provision timing of intelligent radio information;

or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, in a case that the update result is update failure, the update result includes update failure indication information and/or a reason for the update failure.

In one embodiment, the method further includes:

performing incremental modification expression according to the exposure update request and on a basis of a currently effectuating intelligent radio information exposure context;

or, performing, according to the exposure update request, full expression in a manner of fully prompting the intelligent radio information exposure context.

In one embodiment, the method further includes:

sending an exposure de-activation request to the at least one extended application, where the exposure de-activation request at least includes an identification of the intelligent radio information exposure context;

obtaining an intelligent radio information exposure de-activation result fed back by the at least one extended application, where the intelligent radio information exposure de-activation result includes de-activation success or de-activation failure; and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, the method further includes:

obtaining an exposure de-activation request sent by the at least one extended application, where the exposure de-activation request at least includes an identification of the intelligent radio information exposure context;

selecting a corresponding function, according to the exposure de-activation request, specifically according to the identification of the exposure context in the de-activation request, to obtain a selection result; and sending, according to the selection result, an intelligent radio information exposure de-activation result to the at least one extended application, where the intelligent radio information exposure de-activation result includes de-activation success or de-activation failure.

In one embodiment, the sending, according to the selection result, the de-activation result to the at least extended application includes:

determining, in a case of a successful function selection, that the intelligent radio information exposure de-activation result is de-activation success;

determining, in a case of a failed function selection, that the intelligent radio information exposure de-activation result is de-activation failure; where in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, the method further includes: receiving at least one corresponding intelligent radio information report provided by the extended application in a case that the intelligent radio information exposure context is effectuating;

providing an external function with the intelligent radio information report corresponding to the at least one extended application;

where the intelligent radio information report at least includes an identification of the intelligent radio information exposure context, an identification of intelligent radio information, reporting time of intelligent radio information, or content of intelligent radio information;

or, the intelligent radio information report at least includes an identification of the intelligent radio information exposure context, an identification of intelligent radio information, reporting timing of intelligent radio information, or content of intelligent radio information, and a format of the intelligent radio information.

In one embodiment, after receiving the at least one corresponding intelligent radio information report provided by the extended application, the method further includes:

sending a receiving result to the at least one extended application, where the receiving result is used to characterize that the intelligent radio information report has been received.

In one embodiment, the intelligent radio exposure sub-system is provided in a near real-time radio access network intelligent controller.

In one embodiment of the present disclosure provides an intelligent radio information exposure method, applied to an extended application, including:

obtaining an exposure activation request sent by an intelligent radio exposure sub-system;

performing processing for the exposure activation request according to current operating information of the extended application itself, to obtain an activation result, where the activation result includes activation success or activation failure, and the operating information includes at least one of the following: startup status information of a corresponding function of the extended application itself, load information produced from startup of the function in the extended application, or integrated extraction constraint information;

sending the activation result to the intelligent radio exposure sub-system, to enable the intelligent radio exposure sub-system to establish an intelligent radio information exposure context with the extended application when the activation result is activation success, where the establishing the intelligent radio information exposure context is used to characterize establishment of a connection between the intelligent radio exposure sub-system and the extended application.

According to the intelligent radio information exposure method provided by the present disclosure, the exposure activation request sent by the intelligent radio exposure sub-system is obtained, processing is performed for the exposure activation request according to current operating information of the extended application itself, and the corresponding activation result is fed back, to enable the intelligent radio exposure sub-system to establish the intelligent radio information exposure context with the extended application when obtaining the activation result of activation success, and the intelligent radio information generated by the at least one extended application can be provided to the external device based on the intelligent radio information exposure context, achieving the exposure of the intelligent radio information.

In one embodiment, the exposure activation request at least includes an identification of the intelligent radio information exposure context, an identification of intelligent radio information required to be exposed, or required provision timing of intelligent radio information;

or, the exposure activation request at least includes at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, the method further includes:

performing according to the integrated extraction constraint information, when the identification of the intelligent radio information is plural in number, an extraction operation for intelligent radio information corresponding to the identification of the intelligent radio information being plural in number.

In one embodiment, in a case that the activation result is activation failure, the activation result includes failure indication information and/or a reason for the activation failure.

In one embodiment, before obtaining the exposure activation request sent by the intelligent radio exposure sub-system, the method further includes:

sending an application exposure profile to the intelligent radio exposure sub-system, to enable the intelligent radio exposure sub-system to perform a storage operation for the application exposure profile.

In one embodiment, the application exposure profile at least includes an identification of the extended application, an identification of output information of the extended application, and a format of output information of the extended application;

or, the application exposure profile at least includes at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

In one embodiment, the method further includes:

obtaining an exposure update request sent by the intelligent radio exposure sub-system;

performing processing for the exposure update request according to current operating information of the extended application itself, to obtain an update result, where the update result includes update success or update failure, and the operating information includes at least one of the following: startup status information of a corresponding function of the extended application itself, load information produced from startup of the function in the extended application, or integrated extraction constraint information;

sending the update result to the intelligent radio exposure sub-system, to enable the intelligent radio exposure sub-system to update the intelligent radio information exposure context between the intelligent radio exposure sub-system and the extended application when the update result is update success.

In one embodiment, the exposure update request at least includes an identification of the intelligent radio information exposure context, an updated provision manner of intelligent radio information, or updated provision timing of intelligent radio information;

or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, in a case that the update result is update failure, the update result includes update failure indication information and/or a reason for the update failure.

In one embodiment, the method further includes:

obtaining an exposure de-activation request sent by the intelligent radio exposure sub-system, where the exposure de-activation request at least includes an identification of the intelligent radio information exposure context;

selecting a corresponding function, according to the exposure de-activation request, specifically according to the identification of the intelligent radio information exposure context in the exposure de-activation request, to obtain a selection result;

sending an intelligent radio information exposure de-activation result to the intelligent radio exposure sub-system according to the selection result, where the intelligent radio information exposure de-activation result includes de-activation success or de-activation failure.

In one embodiment, the selecting the corresponding function, according to the exposure de-activation request, specifically according to the identification of the intelligent radio information exposure context in the exposure de-activation request, to obtain the selection result includes:

determining, in a case of a successful function selection, that the intelligent radio information exposure de-activation result is de-activation success;

determining, in a case of a failed function selection, that the intelligent radio information exposure de-activation result is de-activation failure; where in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, the method further includes:

sending an exposure de-activation request to the intelligent radio exposure sub-system, where the exposure de-activation request at least includes an identification of the intelligent radio information exposure context;

obtaining an intelligent radio information exposure de-activation result fed back by the intelligent radio exposure sub-system; where the intelligent radio information exposure de-activation result includes de-activation success or de-activation failure, and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, in a case that the intelligent radio information exposure context is effectuating, the method further includes:

sending an intelligent radio information report to the intelligent radio exposure sub-system, to enable the intelligent radio exposure sub-system to provide at least one intelligent radio information report corresponding to the extended application to an external function;

obtaining a receiving result fed back by the intelligent radio exposure sub-system, where the receiving result is used to characterize that the intelligent radio information report has been received;

where the intelligent radio information report at least includes an identification of the intelligent radio information exposure context, an identification of intelligent radio information, reporting timing of intelligent radio information, or content of intelligent radio information;

or, the intelligent radio information report at least includes an identification of the intelligent radio information exposure context, an identification of intelligent radio information, reporting timing of intelligent radio information, or content of intelligent radio information, and a format of the intelligent radio information.

In one embodiment, the extended application is provided in a near real-time radio access network intelligent controller.

In one embodiment of the present disclosure provides an intelligent radio information exposure apparatus, applied to an intelligent radio exposure sub-system, including a memory, a transceiver, and a processor;

where the memory is configured to store a computer program; the transceiver is configured to send and receive data under control of the processor; the processor is configured to read the computer program in the memory and perform operations of:

sending an exposure activation request to at least one extended application;

obtaining an activation result fed back by each extended application, where the activation result is determined by the extended application according to current operating information of the extended application itself, the activation result includes activation success or activation failure, and the operating information includes at least one of the following: startup status information of a corresponding function of the extended application itself, load information produced from startup of the function in the extended application, or integrated extraction constraint information;

establishing, when the activation result is activation success, an intelligent radio information exposure context between the intelligent radio exposure sub-system and the extended application, where the establishing the intelligent radio information exposure context is used to characterize establishment of a connection between the intelligent radio exposure sub-system and the extended application.

In one embodiment, the exposure activation request at least includes an identification of the intelligent radio information exposure context, an identification of intelligent radio information required to be exposed, or required provision timing of intelligent radio information;

or, the exposure activation request at least includes at least one of the following items: an identification of the intelligent radio information exposure context, an identification of the intelligent radio information required to be exposed, required provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, in a case that the activation result is activation failure, the activation result includes failure indication information and/or a reason for the activation failure.

In one embodiment, before sending the exposure activation request to the at least one extended application, the processor is further configured to:

obtain an application exposure profile sent by each extended application;

perform a storage operation for the application exposure profile sent by each extended application; and where when performing the storage operation for the application exposure profile sent by each extended application, the processor is configured to:

for each extended application, if it is detected that there is a stored exposure profile corresponding to the extended application, use the obtained application exposure profile to overwrite the stored exposure profile.

In one embodiment, the application exposure profile at least includes an identification of the extended application, an identification of output information of the extended application and a format of output information of the extended application;

or, the application exposure profile at least includes at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

In one embodiment, the processor is further configured to:

send an exposure update request to the at least one extended application;

obtain an update result fed back by each extended application, where the update result is determined by the extended application according to current operating information of the extended application itself, the update result includes update success or update failure, and the operating information includes at least one of the following: startup status information of a corresponding function of the extended application itself, load information produced from startup of the function in the extended application, or integrated extraction constraint information;

when the update result is update success, update the intelligent radio information exposure context between the intelligent radio exposure sub-system and the extended application.

In one embodiment, the exposure update request at least includes an identification of the intelligent radio information exposure context, an updated provision manner of intelligent radio information, or updated provision timing of intelligent radio information;

or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, in a case that the update result is update failure, the update result includes update failure indication information and/or a reason for the update failure.

In one embodiment, the processor is further configured to:

perform incremental modification expression according to the exposure update request and on a basis of a currently effectuating intelligent radio information exposure context;

or, perform, according to the exposure update request, full expression in a manner of fully prompting the intelligent radio information exposure context.

In one possible design, the processor is further configured to:

send an exposure de-activation request to the at least one extended application, where the exposure de-activation request at least includes an identification of the intelligent radio information exposure context;

obtain an intelligent radio information exposure de-activation result fed back by the at least one extended application, where the intelligent radio information exposure de-activation result includes de-activation success or de-activation failure; and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, the processor is further configured to:

obtain an exposure de-activation request sent by the at least one extended application, where the exposure de-activation request at least includes an identification of the intelligent radio information exposure context;

select a corresponding function, according to the exposure de-activation request, specifically according to the identification of the exposure context in the de-activation request, to obtain a selection result; and send, according to the selection result, an intelligent radio information exposure de-activation result to the at least one extended application, where the intelligent radio information exposure de-activation result includes de-activation success or de-activation failure.

In one embodiment, when sending, according to the selection result, the de-activation result to the at least extended application, the processor is configured to:

determine, in a case of a successful function selection, that the intelligent radio information exposure de-activation result is de-activation success;

determine, in a case of a failed function selection, that the intelligent radio information exposure de-activation result is de-activation failure; where in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, when receiving at least one corresponding intelligent radio information report provided by the extended application in a case that the intelligent radio information exposure context is effectuating, the processor is configured to:

provide an external function with the at least one intelligent radio information report corresponding to the extended application;

where the intelligent radio information report at least includes an identification of the intelligent radio information exposure context, an identification of intelligent radio information, reporting timing of intelligent radio information, or content of intelligent radio information;

or, the intelligent radio information report at least includes an identification of the intelligent radio information exposure context, an identification of intelligent radio information, reporting timing of intelligent radio information, or content of intelligent radio information, and a format of the intelligent radio information.

In one embodiment, after obtaining the at least one intelligent radio information report sent by the extended application, the processor is further configured to:

send a receiving result to the at least one extended application, where the receiving result is used to characterize that the intelligent radio information report has been received.

In one embodiment, the intelligent radio exposure sub-system is provided in a near real-time radio access network intelligent controller.

In one embodiment of the present disclosure provides an intelligent radio information exposure apparatus, applied to an extended application, including a memory, a transceiver, and a processor, where the memory is configured to store a computer program; the transceiver is configured to send and receive data under control of the processor; the processor is configured to read the computer program in the memory and perform operations of:

obtaining an exposure activation request sent by an intelligent radio exposure sub-system;

performing processing for the exposure activation request according to current operating information of the extended application itself, to obtain an activation result, where the activation result includes activation success or activation failure, and the operating information includes at least one of the following: startup status information of a corresponding function of the extended application itself, load information produced from startup of the function in the extended application, or integrated extraction constraint information;

sending the activation result to the intelligent radio exposure sub-system, to enable the intelligent radio exposure sub-system to establish an intelligent radio information exposure context with the extended application when the activation result is activation success, where the establishing the intelligent radio information exposure context is used to characterize establishment of a connection between the intelligent radio exposure sub-system and the extended application.

In one embodiment, the exposure activation request at least includes an identification of the intelligent radio information exposure context, an identification of intelligent radio information required to be exposed, or required provision timing of intelligent radio information;

or, the exposure activation request at least includes at least one of the following items: an identification of the intelligent radio information exposure context, an identification of the intelligent radio information required to be exposed, required provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, the processor is further configured to:

perform according to the integrated extraction constraint information, when the identification of the intelligent radio information is plural in number, an extraction operation for intelligent radio information corresponding to the identification of the intelligent radio information being plural in number.

In one embodiment, in a case that the activation result is activation failure, the activation result includes failure indication information and/or a reason for the activation failure.

In one embodiment, before obtaining the exposure activation request sent by the intelligent radio exposure sub-system, the processor is further configured to:

send an application exposure profile to the intelligent radio exposure sub-system, to enable the intelligent radio exposure sub-system to perform a storage operation for the application exposure profile.

In one embodiment, the application exposure profile at least includes an identification of the extended application, an identification of output information of the extended application, and a format of output information of the extended application;

or, the application exposure profile at least includes at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

In one embodiment, the processor is further configured to:

obtain an exposure update request sent by the intelligent radio exposure sub-system;

perform processing for the exposure update request according to current operating information of the extended application itself, to obtain an update result, where the update result includes update success or update failure, and the operating information includes at least one of the following: startup status information of a corresponding function of the extended application itself, load information produced from startup of the function in the extended application, or integrated extraction constraint information;

send the update result to the intelligent radio exposure sub-system, to enable the intelligent radio exposure sub-system to update the intelligent radio information exposure context between the intelligent radio exposure sub-system and the extended application when the update result is update success.

In one embodiment, the exposure update request at least includes an identification of the intelligent radio information exposure context, an updated provision manner of intelligent radio information, or updated provision timing of intelligent radio information;

or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system;

where the identification of the intelligent radio information is at least one in number.

In one embodiment, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction;

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, in a case that the update result is update failure, the update result includes update failure indication information and/or a reason for the update failure.

In one embodiment, the processor is further configured to:

obtain an exposure de-activation request sent by the intelligent radio exposure sub-system, where the exposure de-activation request at least includes an identification of the intelligent radio information exposure context;

select a corresponding function, according to the exposure de-activation request, specifically according to the identification of the intelligent radio information exposure context in the exposure de-activation request, to obtain a selection result;

send an intelligent radio information exposure de-activation result to the intelligent radio exposure sub-system according to the selection result, where the intelligent radio information exposure de-activation result includes de-activation success or de-activation failure.

In one embodiment, when selecting the corresponding function, according to the exposure de-activation request, specifically according to the identification of the intelligent radio information exposure context in the exposure de-activation request, to obtain the selection result, the processor is configured to:

determine, in a case of a successful function selection, that the intelligent radio information exposure de-activation result is de-activation success;

determine, in a case of a failed function selection, that the intelligent radio information exposure de-activation result is de-activation failure; where in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, the processor is further configured to:

send an exposure de-activation request to the intelligent radio exposure sub-system, where the exposure de-activation request at least includes an identification of the intelligent radio information exposure context;

obtain an intelligent radio information exposure de-activation result fed back by the intelligent radio exposure sub-system; where the intelligent radio information exposure de-activation result includes de-activation success or de-activation failure, and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In one embodiment, in a case that the intelligent radio information exposure context is effectuating, the processor is further configured to:

send an intelligent radio information report to the intelligent radio exposure sub-system, to enable the intelligent radio exposure sub-system to provide at least one intelligent radio information report corresponding to the extended application to an external function;

obtain a receiving result fed back by the intelligent radio exposure sub-system, where the receiving result is used to characterize that the intelligent radio information report has been received;

where the intelligent radio information report at least includes an identification of the intelligent radio information exposure context, an identification of intelligent radio information, reporting timing of intelligent radio information, or content of intelligent radio information;

or, the intelligent radio information report at least includes an identification of the intelligent radio information exposure context, an identification of intelligent radio information, reporting time of intelligent radio information, or content of intelligent radio information, and a format of the intelligent radio information.

In one embodiment, the extended application is provided in a near real-time radio access network intelligent controller.

In one embodiment of the present disclosure provides an intelligent radio information exposure apparatus, applied to an intelligent radio exposure sub-system, and including a functional unit for executing the intelligent radio information exposure method according to the embodiments.

In one embodiment of the present disclosure provides an intelligent radio information exposure apparatus, applied to an extended application, and including a functional unit for executing the intelligent radio information exposure method according to the second aspect.

In one embodiment of the present disclosure provides a processor-readable storage medium storing a computer program, where the computer program is used to enable a processor to execute the method according to the first aspect or the second aspect as described above.

In one embodiment of the present disclosure provides a near real-time radio access network intelligent controller, which includes the intelligent radio exposure sub-system according to the embodiments.

According to the intelligent radio information exposure method and apparatus, and the system and the storage medium provided in the present disclosure, the intelligent radio exposure sub-system sends the exposure activation request to the at least one extended application, and it can establish, when the activation result is activation success, the intelligent radio information exposure context with the extended application, to obtain, based on the intelligent radio information exposure context, the intelligent radio information generated by the at least one extended application, and provide the intelligent radio information to the external device, achieving the exposure of the intelligent radio information.

It should be understood that what is described in the SUMMARY section above is not intended to limit key or important features of the present disclosure, nor is it intended to limit the scope of the present disclosure. Other features of the present disclosure will become readily understood from the following description.

BRIEF DESCRIPTION OF DRAWINGS

In order to describe the embodiments of the present disclosure more clearly, drawings that need to be used in the description of embodiments or prior art will be introduced briefly in the following.

DESCRIPTION OF EMBODIMENTS

Figure 1:
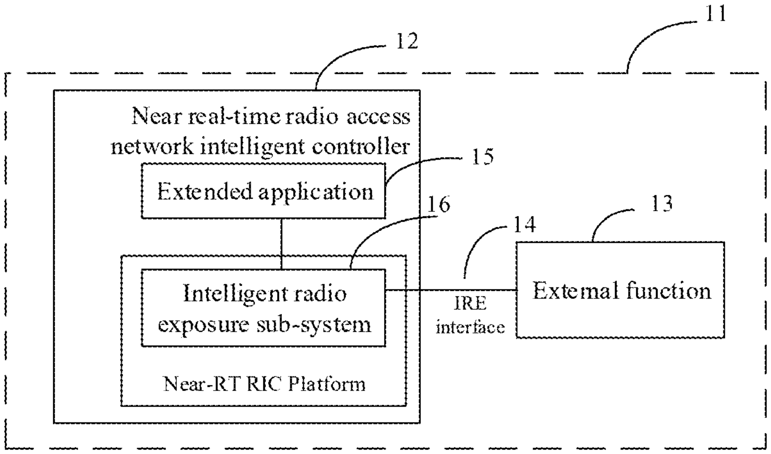
FIG. 1 is a schematic diagram of a general network architecture of an intelligent radio information exposure system provided by the present disclosure.

The embodiments of the present disclosure will be described below clearly and completely in conjunction with the drawings in the embodiments of the present disclosure. Obviously, the described embodiments are merely part of the embodiments of the present disclosure, rather than all of the embodiments. Based on the embodiments in the present disclosure, all other embodiments shall belong to the protection scope of the present disclosure.

The term "a plurality of" in the embodiments of the present disclosure refers to two or more than two, and other quantifiers are similar thereto.

In order to achieve the exposure of intelligent radio information generated by an extended application, the present disclosure provides an intelligent radio information exposure method and apparatus, and a system, and a storage medium.

The intelligent radio information is obtained by performing intelligent processing for radio information obtained from a RAN and auxiliary information for intelligent processing obtained from a Non-RT RIC, and then extracting signaling, strategy and other information used for guiding RAN behaviors therein.

It should be noted that the intelligent radio information exposure method and apparatus, and the system, and the storage medium provided by the present disclosure can be applied to any scenario in which the intelligent radio information is exposed.

The O-RAN architecture defines a Near-RT RIC (Near Real Time RAN Intelligent Controller), where the Near-RT RIC obtains auxiliary information (A1 Enrichment Information, A1-EI for short) for intelligent processing from a Non-RT RIC (non real-time RAN intelligent controller), obtains radio information from a RAN, and then performs intelligent processing to finally obtain signaling and policies used for guiding RAN behaviors. The Near-RT RIC has an intelligent processing capability through which it can not only generate the signaling and policies to guide the RAN behaviors but also generate intelligent radio information for non-RAN information devices such as service servers and core network NWDAFs (network data analytic functions) as a basis for service adjustment and a radio input for global network analysis. In the existing method for providing the intelligent radio information, the Near-RT RIC and an application server are typically linked together through an Nz interface, and the Near-RT RIC delivers the generated intelligent radio information to the application server as required. However, the provision of the intelligent radio information is only addressed on the external interface of the Near-RT RIC. As for how the exposure of intelligent radio information is handled within the Near-RT RIC, there is no further statement.

In the process of solving the problem mentioned above, the inventors discovered through research that in order to realize the exposure of intelligent radio information, an intelligent radio exposure sub-system (IRESS for short) can be introduced into Near-RT RIC. The IRESS is responsible for connecting to an exposure interface of the Near-RT RIC and an extended application that can generate the intelligent radio information. By sending an exposure activation request to at least one extended application, when an activation result of activation success is obtained, an intelligent radio information exposure context can be established with the extended application, and the intelligent radio information generated by the at least one extended application can be received based on the intelligent radio information exposure context, and then provided to an external device, thereby realizing the exposure of the intelligent radio information.

FIG. 1 is a schematic diagram of a general network architecture of an intelligent radio information exposure system provided by the present disclosure. As shown in FIG. 1, the intelligent radio information exposure system 11 includes a near real-time radio access network intelligent controller 12 and an external function 13, and the near real-time radio access network intelligent controller 12 is connected and communicated with the external function 13 through a preset IRE (Intelligent Radio Exposure) interface 14.

The near real-time radio access network intelligent controller 12 includes at least one extended application 15 and an intelligent radio exposure sub-system 16 connected and communicated with each extended application 15 respectively;

the intelligent radio exposure sub-system 16 is connected and communicated with the external function 13 through the preset IRE interface 14; and the intelligent radio exposure sub-system 16 is configured to obtain intelligent radio information generated by the at least one extended application 15, and expose the intelligent radio information to the external function 13 through the IRE interface 14.

In the present disclosure, the intelligent radio information exposure system 11 includes the near real-time radio access network intelligent controller 12 and the external function 13. The near real-time radio access network intelligent controller 12 is connected and communicated with the external function 13 through the preset IRE interface 14, and the near real-time radio access network intelligent controller 12 can exchange information with the external function 13, and in particular, it can send the intelligent radio information to the external function 13 through the IRE interface 14.

Further, the near real-time radio access network intelligent controller 12 includes the at least one extended application 15 and the intelligent radio exposure sub-system 16 connected and communicated with each extended application 15 respectively, and the intelligent radio exposure sub-system 16 can exchange information with each extended application 15 respectively. The at least one extended application 15 can generate intelligent radio information, and the intelligent radio exposure sub-system 16 can obtain the intelligent radio information generated by the at least one extended application 15.

Further, the intelligent radio exposure sub-system 16 provided in the intelligent radio information exposure system 11 can be connected and communicated with the external function 13 through the preset IRE interface 14. Therefore, after obtaining the intelligent radio information generated by the at least one extended application 15, the intelligent radio exposure sub-system 16 can expose the intelligent radio information to the external function 13 through the IRE interface 14, thereby realizing the exposure of the intelligent radio information.

Figure 2:
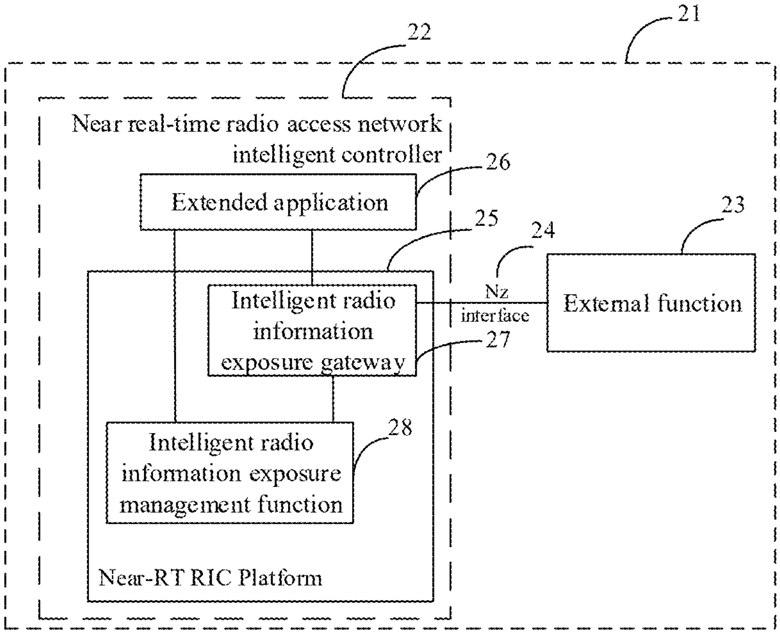
FIG. 2 is a schematic diagram of a network architecture of an intelligent radio information exposure system provided by the present disclosure.

FIG. 2 is a schematic diagram of a network architecture of an intelligent radio information exposure system provided by the present disclosure. As shown in FIG. 2, an intelligent radio information exposure system 21 includes a near real-time radio access network intelligent controller 22 and an external function 23. The near real-time radio access network intelligent controller 22 is connected and communicated with the external function 23 through a preset Nz interface 24;

the near real-time radio access network intelligent controller 22 includes an intelligent radio exposure sub-system 25 and at least one extended application 26. The intelligent radio exposure sub-system 25 includes an intelligent radio information exposure gateway 27 and an intelligent radio information exposure management function 28;

the intelligent radio information exposure gateway 27 is connected and communicated with the at least one extended application 26 through a preset first interface, to obtain intelligent radio information generated by the at least one extended application 26;

the intelligent radio information exposure management function 28 is connected and communicated with the at least one extended application 26 through a preset second interface, and it is configured to perform a management operation for the at least one extended application 26, where the management operation includes delivering of an application exposure profile, and at least one of creating, updating, and deleting of an intelligent radio information exposure context.

In the present disclosure, the near real-time radio access network intelligent controller 22 may specifically include the intelligent radio exposure sub-system 25 and the at least one extended application 26. The intelligent radio exposure sub-system 25 is connected and communicated with each extended application 26 respectively, to obtain the intelligent radio information generated by each extended application 26.

Further, the intelligent radio exposure sub-system 25 includes the intelligent radio information exposure gateway 27 and the intelligent radio information exposure management function 28. The intelligent radio information exposure gateway 27 can be connected and communicated with each extended application 26 through the first interface, and it can exchange information with each extended application 26. Accordingly, the intelligent radio information exposure gateway 27 can obtain, through the first interface, the intelligent radio information generated by each extended application, and expose the intelligent radio information to the external function through the Nz interface.

Further, the intelligent radio exposure sub-system 25 further includes the intelligent radio information exposure management function 28, which can be connected and communicated with each extended application 26 through the preset second interface and thereby being capable of exchanging information with each extended application 26 respectively. The intelligent radio information exposure management function 28 can be specifically used to perform a management operation for each extended application 26, where the management operation includes the delivering of the application exposure profile, and the at least one of creating, updating, or deleting of the intelligent radio information exposure context.

With the intelligent radio information exposure system provided by the present disclosure, the at least one extended application and the intelligent radio exposure sub-system are provided in the near real-time radio access network intelligent controller, and after establishing the intelligent radio information exposure context with each extended application, the intelligent radio exposure sub-system can obtain the intelligent radio information generated by the at least one extended application. Through a connection and communication between the intelligent radio exposure sub-system and the external function, the intelligent radio exposure sub-system can provide, after obtaining intelligent radio information generated by the at least one extended application, the intelligent radio information to the external function, thereby realizing the exposure of the intelligent radio information.

Figure 3:
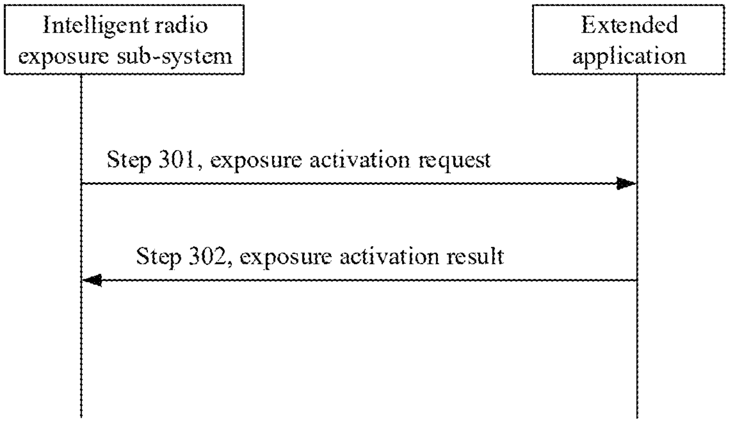
FIG. 3 is a schematic flowchart of an intelligent radio information exposure method provided by the present disclosure.

FIG. 3 is a schematic flowchart of an intelligent radio information exposure method provided by the present disclosure, applied to an intelligent radio exposure sub-system, and the method includes the following steps.

Step 301, the intelligent radio exposure sub-system sends an exposure activation request to at least one extended application.

Step 302, the extended application feeds an activation result back to the intelligent radio exposure sub-system; where the activation result is determined by the extended application according to current operating information of the extended application itself, the activation result includes activation success or activation failure, and the operating information includes at least one of the following: startup status information of a corresponding function of the extended application itself, load information produced from startup of the function in the extended application, or integrated extraction constraint information.

When the activation result is activation success, the intelligent radio exposure sub-system establishes an intelligent radio information exposure context with the extended application, where the establishing the intelligent radio information exposure context is used to characterize establishment of a connection between the intelligent radio exposure sub-system and the extended application.

In the present disclosure, in order to realize the exposure of intelligent radio information, the intelligent radio exposure sub-system first needs to establish the intelligent radio information exposure context with each extended application. Therefore, an intelligent radio information exposure sub-system can send an exposure activation request to the at least one extended application. In one embodiment, the intelligent radio information exposure sub-system can first determine a currently selected extended application, and send the exposure activation request to the at least one selected extended application, or send the exposure activation request to all extended applications, which is not limited in the present disclosure.

In one embodiment, the exposure activation request at least includes an identification of the intelligent radio information exposure context, an identification of intelligent radio information required to be exposed, or required provision timing of intelligent radio information;

or, the exposure activation request at least includes at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system;

where the identification of the intelligent radio information is at least one in number.

Accordingly, after the exposure activation request is sent to each extended application, each extended application can determine, according to current operating information of the extended application itself, whether to establish the intelligent radio information exposure context with the intelligent radio exposure sub-system, to obtain the activation result. The operating information includes at least one of the following: startup status information of a corresponding function of the extended application itself, load information produced from startup of the function in the extended application, or integrated extraction constraint information.

It should be noted that the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, the extended application can specifically determine, according to the data carried in the exposure activation request together with synthetical consideration of the startup status or the load of the corresponding function, the integrated extraction constraint information, or the like, whether to establish the intelligent radio information exposure context with the intelligent radio exposure sub-system to obtain the activation result. For example, if the extended application is currently in an un-started state, it may refuse to establish the intelligent radio information exposure context with the intelligent radio exposure sub-system. In this case, the activation result may be activation failure.

Accordingly, the intelligent radio exposure sub-system can obtain the activation result sent by each extended application, and when the activation result is activation success, the intelligent radio exposure sub-system establishes the intelligent radio information exposure context with the extended application. The establishing the intelligent radio information exposure context is used to characterize establishment of a connection between the intelligent radio exposure sub-system and the extended application. After the intelligent radio information exposure context is established with the extended application, the intelligent radio information generated by the extended application can be obtained and exposed to the external function through a preset interface.

Further, in a case that the activation result is activation failure, the activation result includes failure indication information and/or a reason for the activation failure.

In the present disclosure, when the extended application determines, based on its own operating information, that it is impossible to establish the intelligent radio information exposure context with the intelligent radio exposure sub-system, the extended application can feed the activation result of activation failure back to the intelligent radio exposure sub-system. The activation result may specifically include the failure indication information. For example, the failure indication information may specifically be Result-failure. In one embodiment, the activation result of the activation failure may selectively carry the reason for the activation failure.

Table 1 is an embodiment of an exposure activation request message and an exposure activation result message provided by the present disclosure. As shown in Table 1:

TABLE 1

| Information Element | Exhibition | Quantity | Explanation |
|---|---|---|---|
| | | | Exposure activation request message |
| xApp Exposure ID | Required | 1 | xAPP exposure identification, e.g., a combination of xAPP ID, IRESS ID, and Exposure ID. |

TABLE 1-continued

| Information Element | Exhibition | Quantity | Explanation |
|---|---|---|---|
| IRESS endpoint | Required | 1 | Endpoint through which IRESS receives intelligent radio information, e.g., it may be IP address + port number; or URI (Uniform Resource Identifier), or the like. |
| xApp Exposure Requirement | Required | 1 | Requirement of IRESS for exposing intelligent radio information. |
| >xApp Exposure Requirement Item | Required | 1 . . . N | xApp Exposure Requirement includes several xApp Exposure Requirement Items. |
| >>Intelligent Radio Info ID List | Required | 1 | List of intelligent radio information required by IRESS. The intelligent radio information referred to in this list has an integrated extraction relationship with each other. |
| >>>Intelligent Radio Info ID | Required | 1 . . . N | Identification of intelligent radio information required by IRESS. Several such identifications together form an Intelligent Radio Info ID List, e.g., a set of ASCII printable characters. |
| >> Intelligent Radio Info Format | Required | 1 | Format of output information required by IRESS, e.g., text/plain, text/html, text/xml, or the like. |
| >> Intelligent Radio Info Timing | Required | 1 | Timing provision of intelligent radio information required by IRESS. |
| >>>Timing Type | Required | 1 | Manner for reporting intelligent radio information. Value option: IMMEDIATELY (specified intelligent radio information is only used as a response after the current request and is provided once by an extended application), PERIODIC (specified intelligent radio information is not only used as a response after the current request but also appears periodically afterward, and is provided for multiple times by the extended application), EVENT (after a specific event occurs, specified intelligent radio information is provided by the extended application), PERIODIC&EVENT (including both a situation in which specified intelligent radio information is provided by the extended application after the specific event occurs, and a situation in which specified intelligent radio information appears periodically and is provided by the extended application for multiple times), or PERIODIC-AFTER-EVENT (after the specific event occurs, specified intelligent radio information appears periodically and is provided by the extended application for multiple times). |
| >>>Periodic Report Detail | Conditional optional | 0 . . . 1 | Appear if intelligent radio information is periodic. Describe detailed requirements of a periodic report. "Periodic" here includes three situations: Timing Type = PERIODIC, PERIODIC&EVENT, and PERIODIC-AFTER-EVENT. |
| >>>>Starting Time | Optional | 0 . . . 1 | Starting time for reporting intelligent radio information, e.g., @pekingTime2017062111450000, which means that the reporting starts at Beijing time 11:45 am on Jun. 21, 2017. |
| >>>>Time Unit | Optional | 0 . . . 1 | Time unit interval, e.g., millisecond, second, minute, or the like. |
| >>>>Period | Required | 1 | Interval for reporting intelligent radio information, e.g., agreed interval unit is ms, and the value thereof is 3000, which represents that the interval for reporting is 3000 ms. |
| >>>Event Report Detail | Conditional optional | 0 . . . 1 | Appear when intelligent radio information is based on an event. Describe detailed requirements of an event report. The event here includes three situations: Timing Type = EVENT, PERIODIC&EVENT, and PERIODIC-AFTER-EVENT. |

TABLE 1-continued

| Information Element | Exhibition | Quantity | Explanation |
|---|---|---|---|
| >>>>Event List | Required | 1 | Event description list. This list may include a plurality of events, and there is an "OR" relationship between two events, that is, if the list includes event1 and envent2, a trigger condition is met when envent1 or envent2 occurs. |
| >>>>>Event | Required | 1 . . . N | Event definition. Event definition may include a plurality of clauses, and there is an "AND" relationship among the plurality of clauses, that is, if the list includes condition1 and condition2, it represents that an event occurs when condition1 and condition2 are met simultaneously. |
| . . . | . . . | . . . | . . . |
| Exposure activation result message | | | |
| xApp Exposure ID | Required | 1 | Value option is the same as that of the exposure activation request message. |
| Result | Required | 1 | Result of information processing. Value option is for example: success (it is used when all extractions are valid), or failure (it is used in a situation other than a situation where all extractions are valid). |
| Extended application Endpoint | Conditional optional | 0 . . . 1 | Appear when Result = success, an endpoint through which the extended application sends intelligent radio information, e.g., which may be IP address + port number; or URI, or the like. |
| Reason | Optional | 0 . . . 1 | Appear optionally when Result = failure, which is supplementary indication of a reason for the failure. |
| . . . | . . . | . . . | . . . |

According to the intelligent radio information exposure method provided by the present disclosure, the intelligent radio exposure sub-system sends the exposure activation request to the at least one extended application, and can establish the intelligent radio information exposure context with the extended application when the activation result is activation success, thereby providing, based on the intelligent radio information exposure context, the intelligent radio information generated by the at least one extended application to the external device, and achieving the exposure of the intelligent radio information.

Figure 4:
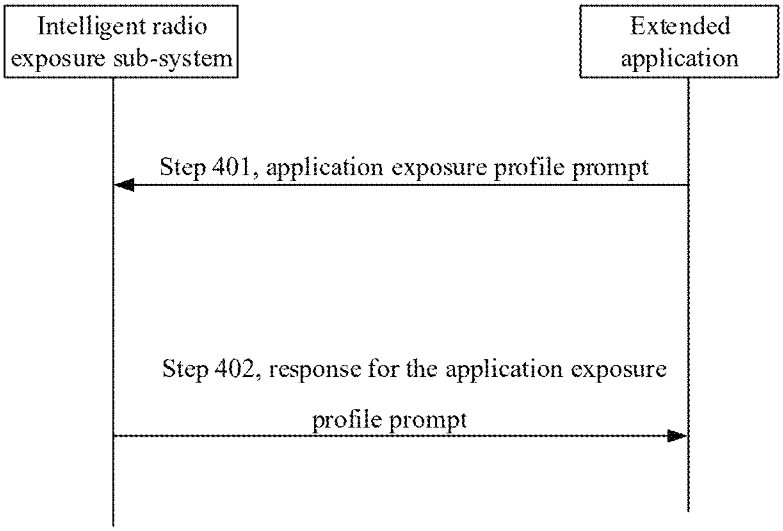
FIG. 4 is a schematic flowchart of an intelligent radio information exposure method provided by the present disclosure.

FIG. 4 is a schematic flowchart of an intelligent radio information exposure method provided by the present disclosure, applied to the intelligent radio exposure sub-system. As shown in FIG. 4, before step 301, the method further includes the following steps.

Step 401, the intelligent radio exposure sub-system obtains an application exposure profile sent by each extended application; and performs a storage operation for the application exposure profile sent by each extended application.

Step 402, the intelligent radio exposure sub-system feeds a receiving result of the application exposure profile back to each extended application.

In the present disclosure, in order to enable the intelligent radio exposure sub-system to learn the intelligent radio information that each extended application can provide, each extended application can send the application exposure profile to the intelligent radio exposure sub-system. The application exposure profile at least includes an identification of the extended application, an identification of output information of the extended application, and a format of output information of the extended application; or, the application exposure profile at least includes at least one of the following items: an identification of the extended application, and an identification of output information of the extended application, a format of output information of the extended application, an identification of intermediate output information of the extended application, a format of intermediate output information of the extended application, usage status of the extended application, a system requirement of the extended application, and a storage space occupied by the extended application.

It should be noted that the application exposure profile at least includes an identification of the extended application, an identification of output information of the extended application, and a format of output information of the extended application, or it may further include an identification of intermediate output information of the extended application, a format of intermediate output information of the extended application, usage status of the extended application, a system requirement of the extended application, and a storage space occupied by the extended application.

Accordingly, the intelligent radio exposure sub-system can obtain and store the application exposure profile sent by each extended application.

In one embodiment, after obtaining the application exposure profile sent by each extended application, the intelligent radio exposure sub-system may also feed the receiving result of the application exposure profile back to each extended application, e.g., it can feed back to each extended application that the application exposure profile has been received.

It should be noted that the extended application can be a form of an exposure profile provider. In addition, the intelligent radio exposure sub-system can also obtain exposure profiles provided by other exposure profile providers. The application exposure profile provider (AEP provider) is a concept, and its specific implementation may be in many ways. In addition to the extended application, the management function or the application repository function (Extended application Repository Function) in the Near-RT RIC platform can also serve as the AEP provider.

Further, step 402 includes:

for each extended application, if it is detected that there is a stored exposure profile corresponding to the extended application, using the obtained application exposure profile to overwrite the stored exposure profile.

In the present disclosure, in order to ensure that the latest version of exposure profile corresponding to the extended application is currently stored, after the application exposure profile corresponding to the extended application is obtained, it is possible to detect, for each extended application, whether there is a stored exposure profile corresponding thereto. If there is the stored exposure profile corresponding thereto, the obtained application exposure profile can be used to overwrite the stored exposure profile. On the contrary, if there is no stored exposure profile corresponding thereto, a storage operation can be performed directly for the obtained application exposure profile.

Table 2 is an embodiment of an application exposure profile message and a receiving result message of the application exposure profile provided by the present disclosure, as shown in Table 2:

TABLE 2

| Information Element | Exhibition | Quantity | Explanation |
|---|---|---|---|
| | Application exposure profile message | | |
| xAPP ID | Required | 1 | xAPP identification, e.g., it may be a set of ASCII printable characters. |
| xAPP Output ID Format | Required | 1 | Format of output information of xAPP, e.g., text/plain, text/html, text/xml, or the like. |
| xAPP Output ID List | Required | 1 | List of final output information of xAPP. |
| >xAPP Output ID | Required | 1 . . . N | Identification of final output information of xAPP. Several such identifications together form a list of final output information of xAPP, e.g., a set of ASCII printable characters. |
| xAPP Intermediate Output ID List | Optional | 0 . . . 1 | List of intermediate output information of xAPP. Some intelligent radio information as intermediate results may have broader uses, and the value of data can be better mined by using this intermediate output information. |
| >xAPP Intermediate Output ID | Required | 1 . . . N | Identification of intermediate output information of xAPP. Several such identifications together form a list of intermediate output information of xAPP, e.g., a set of ASCII printable characters. |
| xAPP Status | Optional | 0 . . . 1 | Usage status of xAPP, e.g., its optional value: on (in-use), or off (out-of-use) |
| xAPP System Requirements | Optional | 0 . . . 1 | System requirements for running xAPP. |
| >RAM | Optional | 0 . . . 1 | RAM requirements for running xAPP. For example: ≥100 Mbyte. |
| >ROM | Optional | 0 . . . 1 | ROM requirements for running xAPP. For example: ≥10 Mbyte. |
| xAPP Software Size | Optional | 0 . . . 1 | Software size of xAPP. For example: 621 Mbyte. |
| . . . | . . . | . . . | . . . |
| | Receiving result message of application exposure profile | | |
| . . . | . . . | . . . | . . . |

For example, it is assumed that an extended application finally outputs predicatedThroughput.next5Min.cell[cellId], which represents predicted throughput of a cell with identification [cellId] in the next 5 minutes. This final output is obtained by calculating all predicatedSINR.next5min.ue [ueId]. cell [cellId] in the cell (which represents a predicted signal to interference plus noise ratio of a terminal with a connection status identification [ueId] in the cell with identification [cellId] in the next 5 minutes).

Then predicatedThroughput.next5Min.cell[cellId] forms an Output ID of the extended application, and predicatedSINR.next5min.ue[ueId]. cell[cellId] forms an Intermediate Output ID of the extended application.

According to the intelligent radio information exposure method provided in the embodiment of the present disclosure, the application exposure profile provided by the extended application is obtained, and it is possible to learn the intelligent radio information that each extended application can provide to the external, thereby providing a basis for the exposure of the intelligent radio information.

Figure 5:
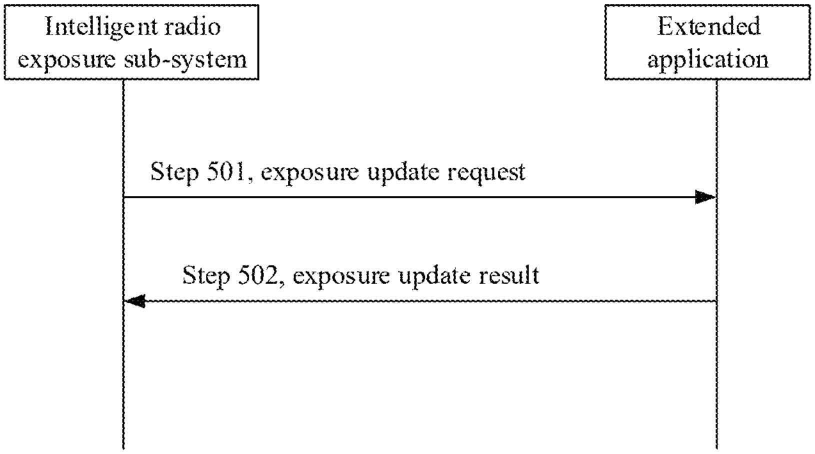
FIG. 5 is a schematic flowchart of an intelligent radio information exposure method provided by the present disclosure.

FIG. 5 is a schematic flowchart of an intelligent radio information exposure method provided by the present disclosure, applied to the intelligent radio exposure sub-system, and as shown in FIG. 5, the method further includes the following steps.

Step 501, the intelligent radio exposure sub-system sends an exposure update request to the at least one extended application.

Step 502, the intelligent radio exposure sub-system obtains an update result fed back by each extended application, where the update result is determined by the extended application according to current operating information of the extended application itself, the update result includes update success or update failure, and the operating information includes at least one of the following: startup status information of a corresponding function of the extended application itself, load information produced from startup of the function in the extended application, or integrated extraction constraint information.

When the update result is update success, the intelligent radio information exposure context is updated between the intelligent radio exposure sub-system and the extended application.

In the present disclosure, when the intelligent radio information required by the external function changes, it is necessary to update the intelligent radio information exposure context with the extended application according to updated information. In one embodiment, the exposure update request may be sent to the at least one extended application, where the exposure update request at least includes an identification of the intelligent radio information exposure context, an updated provision manner of intelligent radio information, or updated provision timing of intelligent radio information; or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system. It should be noted that the exposure update request at least includes an identification of the intelligent radio information exposure context, an updated provision manner of intelligent radio information, or updated provision timing of intelligent radio information. In one embodiment, the exposure update request may further carry a format requirement of the intelligent radio information or a receiving endpoint of the intelligent radio exposure sub-system.

In one embodiment, the updated provision manner of the intelligent radio information may include updated intelligent radio information that needs to be provided to the external application, and an updated manner for providing the intelligent radio information.

The updated identification of the intelligent radio information that needs to be provided to the external application may specifically include newly added intelligent radio information and deleted intelligent radio information. For example, an identification of intelligent radio information that is not present in the prior-update intelligent radio information exposure context but is present in the updated intelligent radio information exposure context is the newly added intelligent radio information; and an identification of intelligent radio information that is present in the prior-update intelligent radio information exposure context but is not present in the updated intelligent radio information exposure context is the deleted intelligent radio information.

The updated manner for providing intelligent radio information may specifically include the updated provision timing of the intelligent radio information, and/or the updated format requirement of the intelligent radio information and/or the updated receiving endpoint of the intelligent radio exposure sub-system. Therefore, afterwards, the intelligent radio exposure sub-system can extract the intelligent radio information according to the updated provision manner of the intelligent radio information.

Further, the extended application can specifically determine, according to the data carried in the exposure update request together with synthetical consideration of the startup status or the load of the corresponding function or the integrated extraction constraint information or the like, whether to establish the intelligent radio information exposure context with the intelligent radio exposure sub-system to obtain the update result. For example, if the extended application is currently in an un-started state, it may refuse to establish the intelligent radio information exposure context with the intelligent radio exposure sub-system. In this case, the update result may be update failure.

Accordingly, the intelligent radio information exposure sub-system can obtain the update result sent by each extended application, and when the update result is update success, the intelligent radio information exposure context is updated between the intelligent radio exposure sub-system and the extended application.

It should be noted that the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

Further, the update result may also be update failure. In a case that the update result is update failure, the update result includes update failure indication information and/or a reason for the update failure.

It should be noted that, when the update result is update failure, the update result at least includes the update failure indication information. For example, the update failure indication information may specifically be Result-failure. In one embodiment, the update result may further include the reason for the update failure.

Further, the method further includes:

performing incremental modification expression according to the exposure update request and on a basis of a currently effectuating intelligent radio information exposure context;

or, performing, according to the exposure update request, full expression in a manner of fully prompting the intelligent radio information exposure context.

In the present disclosure, during the update process, the update operation may be performed in the form of incremental modification performed based on the currently effectuating intelligent radio information exposure context, that is, only the updated part is sent based on the existing context. In one embodiment, the update operation may be performed in a manner of fully prompting the intelligent radio information exposure context, that is, the whole modified intelligent radio information exposure context is sent.

Table 3 is an embodiment of an exposure update request message and an exposure update result message provided by the present disclosure, and illustrates a form of an incremental modification performed based on the currently effectuating intelligent radio information exposure context. As shown in Table 3:

TABLE 3

| Information Element | Exhibition | Quantity | Explanation |
|---|---|---|---|
| | | | Exposure update request message |
| xAPP Exposure ID | Required | 1 | xAPP exposure identification, which indicates the exposure to be updated, e.g., it may be a combination of xAPP ID, IRESS ID, and Exposure ID. |
| IRESS endpoint | Conditional Optional | 0 . . . 1 | Endpoint for receiving intelligent radio information by IRESS, which appears when an update is required, e.g., IP address + port number; or URI, or the like. |
| xAPP Exposure Requirement | Conditional Optional | 0 . . . 1 | Requirement of IRESS for exposing intelligent radio information, which appears when an update is required. |
| >xAPP Exposure Requirement Item | Required | 1 . . . N | xAPP Exposure Requirement includes several xAPP Exposure Requirement Items. |
| >>Intelligent Radio Info ID List | Required | 1 | List of intelligent radio information that IRESS requires to be updated. The intelligent radio information referred to in this list has an integrated extraction relationship with each other. |
| >>>Intelligent Radio Info ID | Required | 1 . . . N | Updated provision manner of the intelligent radio information required by IRESS. Several such identifications together form an Intelligent Radio Info ID List, e.g., a set of ASCII printable characters. |
| >> Intelligent Radio Info Format | Conditional Optional | 0 . . . 1 | Format of output information latest required by IRESS, which appears when an update is required, e.g., text/plain, text/html, text/xml, or the like. |
| >> Intelligent Radio Info Timing | Conditional Optional | 0 . . . 1 | Timing for reporting intelligent radio information latest required by IRESS, which appears when an update is required. |
| >>>Timing Type | Required | 1 | Manner for reporting intelligent radio information latest required by IRESS. Value option: IMMEDIATELY (specified intelligent radio information is only used as a response after the current request and is provided once by xAPP), PERIODIC (specified intelligent radio information is not only used as a response after the current request but also appears periodically afterward, and is provided for multiple times by xAPP), EVENT (after a specific event occurs, specific intelligent radio information is provided by xAPP), PERIODIC&EVENT (including both a situation where specified intelligent radio information is provided by xAPP after the specific event occurs, and a situation where the specified intelligent radio information appears periodically and is provided by xAPP for multiple times), or PERIODIC-AFTER-EVENT (after the specific event occurs, specified intelligent radio information appears periodically and is provided by xAPP for multiple times). |
| >>>Periodic Report Detail | Conditional Optional | 0 . . . 1 | Appear if intelligent radio information is periodic. Describe detailed requirements of a periodic report. "Periodic" here includes three situations: Timing Type = PERIODIC, PERIODIC&EVENT, and PERIODIC-AFTER-EVENT. |
| >>>>Staring Time | Optional | 0 . . . 1 | Starting time for reporting intelligent radio information, e.g., @pekingTime20170621114500000, which means that the reporting starts at Beijing time 11:45 am on Jun. 21, 2017. |
| >>>>Time Unit | Optional | 0 . . . 1 | Time unit interval, e.g., millisecond, second, minute, or the like. |

TABLE 3-continued

| Information Element | Exhibition | Quantity | Explanation |
|---|---|---|---|
| >>>>Period | Optional | 0 . . . 1 | Interval for reporting intelligent radio information, e.g., agreed interval unit is ms, and the value thereof is 3000, which represents that the interval for reporting is 3000 ms. |
| >>>Event Report Detail | Conditional Optional | 0 . . . 1 | Appear when intelligent radio information is based on an event. Describe detailed requirements of an event report. The event here includes three situations: Timing Type = EVENT, PERIODIC&EVENT, and PERIODIC-AFTER-EVENT. |
| >>>>Event List | Required | 1 | Event description list. This list may include a plurality of events, and there is an "OR" relationship between two events, that is, if the list includes event1 and envent2, a trigger condition is met when envent1 or envent2 occurs. |
| >>>>>Event | Required | 1 . . . N | Event definition. Event definition may include a plurality of clauses, and there is an "AND" relationship among the plurality of clauses, that is, if the list includes condition1 and condition2, it represents that an event occurs when condition1 and condition2 are met simultaneously. |
| . . . | . . . | . . . | . . . |
| | | Exposure update result message | |
| xAPP Exposure ID | Required | 1 | Value option is the same as that in the request message. |
| Result | Required | 1 | Result of information processing. Value option is for example: success (it is used when all extractions are valid), or failure (it is used in a situation other than a situation where all extractions are valid). |
| xAPP Endpoint | Conditional Optional | 0 . . . 1 | Appear when Result = success, an endpoint through which xAPP sends intelligent radio information, e.g., which may be IP address + port number; or URI, or the like. |
| Reason | Optional | 0 . . . 1 | Appear optionally when Result = failure, which is supplementary indication of a reason for the failure. |
| . . . | . . . | . . . | . . . |

According to the intelligent radio information exposure method provided in the embodiment of the present disclosure, the intelligent radio information exposure context is updated with the extended application according to the exposure update request, to enable the intelligent radio information exposure context to better conform the requirements in practical applications.

Figure 6:
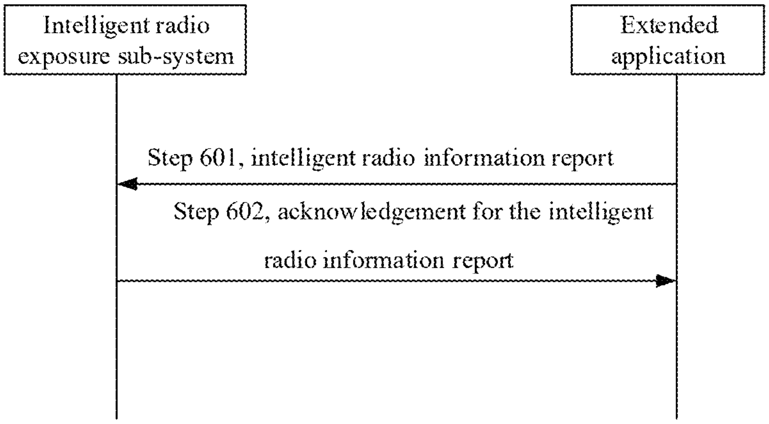
FIG. 6 is a schematic flowchart of an intelligent radio information exposure method provided by the present disclosure.

FIG. 6 is a schematic flowchart of an intelligent radio information exposure method provided by the present disclosure, applied to the intelligent radio exposure sub-system. As shown in FIG. 6, when the intelligent radio information exposure context is effectuating, the method further includes the following steps.

Step 601: the intelligent radio exposure sub-system can receive at least one corresponding intelligent radio information report provided by the extended application; where the intelligent radio information report at least includes an identification of the intelligent radio information exposure context, an identification of intelligent radio information, reporting timing of intelligent radio information, or content of intelligent radio information; or, the intelligent radio information report at least includes an identification of the intelligent radio information exposure context, an identification of intelligent radio information, reporting timing of intelligent radio information, or content of intelligent radio information, and a format of the intelligent radio information; and provide an external function with the at least one intelligent radio information report corresponding to the extended application.

Step 602, the intelligent radio exposure sub-system sends acknowledgement information for the intelligent radio information report to the at least one extended application.

In the present disclosure, when the intelligent radio exposure sub-system obtains an activation result of activation success or an update result of update success, it characterizes that the intelligent radio information exposure context is effectuating. At that point, the exposure of the intelligent radio information is possible to the external function based on the effectuating intelligent radio information exposure context.

In one embodiment, the intelligent radio exposure sub-system can receive the at least one corresponding intelligent radio information report provided by the extended application. The intelligent radio information report at least includes an identification of the intelligent radio information exposure context, an identification of intelligent radio information, reporting timing of intelligent radio information, or content of intelligent radio information. In addition, the intelligent radio information report may selectively carry a format of the intelligent radio information.

After the intelligent radio information report is obtained, the at least one intelligent radio information report corresponding to the extended application can be provided to the external function through a preset interface, to achieve the exposure of intelligent radio information.

Further, after obtaining the at least one intelligent radio information report sent by the extended application, the method further includes:

sending a receiving result to the at least one extended application, where the receiving result is used to characterize that the intelligent radio information report has been received.

In the present disclosure, in order to enable the extended application to learn a transmission result of the intelligent radio information report, after the at least one intelligent radio information report sent by the extended application is obtained, the receiving result of the intelligent radio information report can also be fed back to the extended application, where the receiving result is specifically used to characterize that the intelligent radio information report has been received.

Table 4 is an embodiment of an intelligent radio information report message and a receiving result message of an intelligent radio information report provided by the present disclosure. As shown in Table 4:

TABLE 4

| Information Element | Exhibition | Quantity | Explanation |
|---|---|---|---|
| Intelligent radio information report message | | | |
| xAPP Exposure ID | Required | 1 | xAPP exposure identification, e.g., it may be a combination of xAPP ID, IRESS ID, and Exposure ID. |
| Sequence Number | Optional | 0 . . . 1 | Number of intelligent radio information, e.g., it may be a sequence number of 32 b. |
| xAPP Exposure Detail List | Required | 1 | Detail list of the intelligent radio information report. |
| >xAPP Exposure Detail Item | Required | 1 . . . N | xAPP Exposure Detail List includes several xAPP Exposure Detail Items. |
| >>Intelligent Radio Info ID List | Required | 1 | Identification list of intelligent radio information reported by xAPP.<br>The intelligent radio information referred to in this list has an integrated extraction relationship with each other. |
| >>>Intelligent Radio Info ID | Required | 1 . . . N | Intelligent radio information identification, e.g., it may be a set of ASCII printable characters. |
| >> Intelligent Radio Info Format | Required | 1 | Format of intelligent radio information reported by xAPP, e.g., text/plain, text/html, text/xml, or the like. |
| >> Intelligent Radio Info Timing | Required | 1 | Timing for reporting intelligent radio information by xAPP. |
| >>>Timing Type | Required | 1 | Type of timing for reporting intelligent radio information.<br>Value option: IMMEDIATELY (specified intelligent radio information is only used as a response after the current request and is provided once by xAPP), PERIODIC (specified intelligent radio information is not only used as a response after the current request but also appears periodically afterward, and is provided for multiple times by xAPP), EVENT (after a specific event occurs, specific intelligent radio information is provided by xAPP), PERIODIC&EVENT (including both a situation where specified intelligent radio information is provided by xAPP after the specific event occurs, and a situation where the specified intelligent radio information appears periodically and is provided by xAPP for multiple times), or PERIODIC-AFTER-EVENT (after the specific event occurs, specified intelligent radio information appears periodically and is provided by xAPP for multiple times). |
| >>>Periodic Report Detail | Conditional Optional | 0 . . . 1 | Appear if intelligent radio information is periodic.<br>Describe detailed requirements of a periodic report.<br>“Periodic” here includes three situations: Timing Type = PERIODIC, PERIODIC&EVENT, and PERIODIC-AFTER-EVENT. |
| >>>>Period | Required | 1 | Interval for reporting intelligent radio information, e.g., agreed interval unit is ms, and the value thereof is 3000, which represents that the interval for reporting is 3000 ms. |
| >>>Event Report Detail | Conditional Optional | 0 . . . 1 | Appear when intelligent radio information is based on an event. Describe detailed requirements of an event report.<br>The event here includes three situations: Timing Type = EVENT, PERIODIC&EVENT, and PERIODIC-AFTER-EVENT. |

TABLE 4-continued

| Information Element | Exhibition | Quantity | Explanation |
|---|---|---|---|
| >>>>Event | Required | 1 | Event definition. Event definition may include a plurality of clauses, and there is an "AND" relationship among the plurality of clauses, that is, if the list includes condition1 and condition2, it represents that an event occurs when condition1 and condition2 are met simultaneously. |
| >> Intelligent Radio Info Content | Required | 1 | Content of intelligent radio information. |
| . . . | . . . | . . . | . . . |
| Receiving result message of intelligent radio information report | | | |
| xAPP Exposure ID | Required | 1 | Value option is the same as that in the request message. |
| Sequence Number | Required | 1 | Value option is the same as that in the request message. |
| . . . | . . . | . . . | . . . |

According to the intelligent radio information exposure method provided in the embodiment of the present disclosure, by receiving, when the intelligent radio information exposure context with the extended application is effectuating, the at least one corresponding intelligent radio information report provided by the extended application, and providing the intelligent radio information report to the external function, the exposure of the intelligent radio information can be achieved. In addition, by sending the receiving result to the at least one extended application, the extended application can be enabled to learn the transmission result of the intelligent radio information report in a timely manner.

Figure 7:
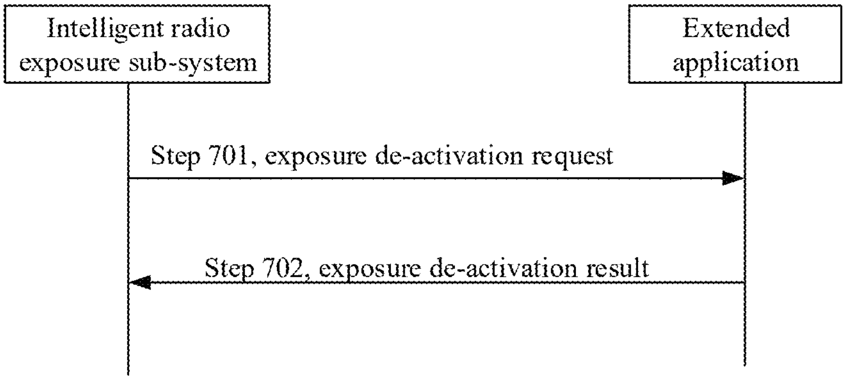
FIG. 7 is a schematic flowchart of an intelligent radio information exposure method provided by the present disclosure.

FIG. 7 is a schematic flowchart of an intelligent radio information exposure method provided by the present disclosure, applied to the intelligent radio exposure sub-system. As shown in FIG. 7, the method further includes:

step 701, the intelligent radio exposure sub-system sends an exposure de-activation request to the at least one extended application, where the exposure de-activation request at least includes an identification of the intelligent radio information exposure context; and step 702, the intelligent radio exposure sub-system obtains an intelligent radio information exposure de-activation result fed back by the at least one extended application, where the intelligent radio information exposure de-activation result includes de-activation success or de-activation failure; and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In the present disclosure, after completing the exposure of the intelligent radio information, the intelligent radio exposure sub-system can send the exposure de-activation request to the at least one extended application, where the exposure de-activation request at least includes an identification of the intelligent radio information exposure context.

After obtaining the exposure de-activation request, each extended application can determine, according to the identification of the intelligent radio information exposure context in the exposure de-activation request, whether to de-activate provision of the intelligent radio information; and can obtain the intelligent radio information exposure de-activation result, where the intelligent radio information exposure de-activation result includes de-activation success or de-activation failure.

Accordingly, the intelligent radio exposure sub-system can obtain the intelligent radio information exposure de-activation result fed back by the at least one extended application, and in a case that the intelligent radio information exposure de-activation result is de-activation failure, the intelligent radio information exposure de-activation result includes de-activation failure indication information, e.g., the de-activation failure indication information may specifically be Result=failure. Or, the intelligent radio information exposure de-activation result includes de-activation failure indication information, and may further include the reason for the de-activation failure.

Table 5 is an embodiment of an exposure de-activation request message and an exposure de-activation result message provided by the present disclosure. As shown in Table 5:

TABLE 5

| Information Element | Exhibition | Quantity | Explanation |
|---|---|---|---|
| Exposure de-activation request message | | | |
| xAPP Exposure ID | Required | 1 | xAPP exposure identification, which indicates the exposure to be updated, e.g., it may be a combination of xAPP ID, IRESS ID, and Exposure ID. |
| Exposure de-activation result message | | | |
| xAPP Exposure ID | Required | 1 | Value option is the same as that in the request message. |

TABLE 5-continued

| Information Element | Exhibition | Quantity | Explanation |
|---|---|---|---|
| Result | Required | 1 | Result of information processing. Value option is for example: success, or failure. |
| Reason | Optional | 0 . . . 1 | Appear optionally when Result = failure, which is supplementary indication of a reason for the failure. |
| . . . | . . . | . . . | . . . |

Figure 8:
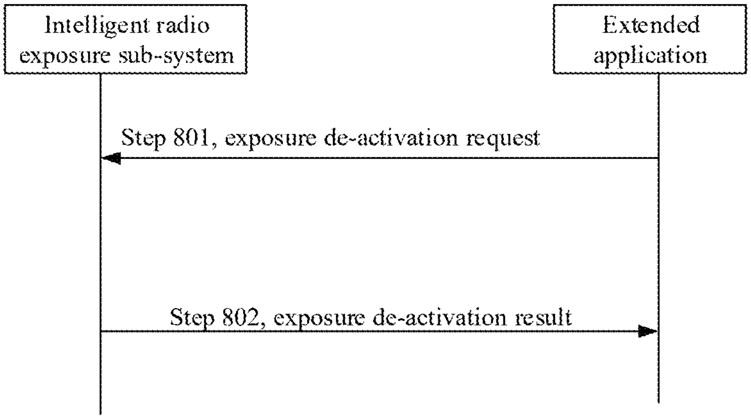
FIG. 8 is a schematic flowchart of an intelligent radio information exposure method provided by the present disclosure.

FIG. 8 is a schematic flowchart of an intelligent radio information exposure method provided by the present disclosure, applied to the intelligent radio exposure sub-system. As shown in FIG. 8, the method further includes:

step 801, the intelligent radio exposure sub-system obtains an exposure de-activation request sent by the at least one extended application, where the exposure de-activation request at least includes an identification of the intelligent radio information exposure context; and selects a corresponding function according to the exposure de-activation request, specifically according to the identification of the exposure context in the de-activation request, to obtain a selection result; and step 802, the intelligent radio exposure sub-system sends, according to the selection result, an intelligent radio information exposure de-activation result to the at least one extended application, where the intelligent radio information exposure de-activation result includes de-activation success or de-activation failure.

In the present disclosure, the exposure de-activation request may also be initiated by the at least one extended application. Accordingly, the intelligent radio exposure sub-system can obtain the exposure de-activation request sent by the at least one extended application, where the exposure de-activation request at least includes an identification of the intelligent radio information exposure context.

After the exposure de-activation request is obtained, the corresponding function can be selected according to the identification of the exposure context in the de-activation request, to obtain the selection result. In one embodiment, in a case that the function selection is successful, the intelligent radio information exposure de-activation result is determined as de-activation success; in a case that the function selection is failed, the intelligent radio information exposure de-activation result is determined as de-activation failure. In a case that the intelligent radio information exposure de-activation result is de-activation failure, the intelligent radio information exposure de-activation result includes de-activation failure indication information, for example, the de-activation failure indication information may specifically be Result-failure. In one embodiment, the intelligent radio information exposure de-activation result includes de-activation failure indication information, and may further include a reason for the de-activation failure.

The embodiment of the exposure de-activation request message and the exposure de-activation result message provided by the present disclosure may be shown in Table 5, which will not be elaborated here.

According to the intelligent radio information exposure method provided by the embodiment of the present disclosure, by sending or receiving the exposure de-activation request, the exposure of the intelligent radio information can be de-activated after exposing the intelligent radio information, thereby ensuring the security of data.

It should be noted that the intelligent radio exposure sub-system described in any of the embodiments mentioned above is provided in a near real-time radio access network intelligent controller.

Figure 9:
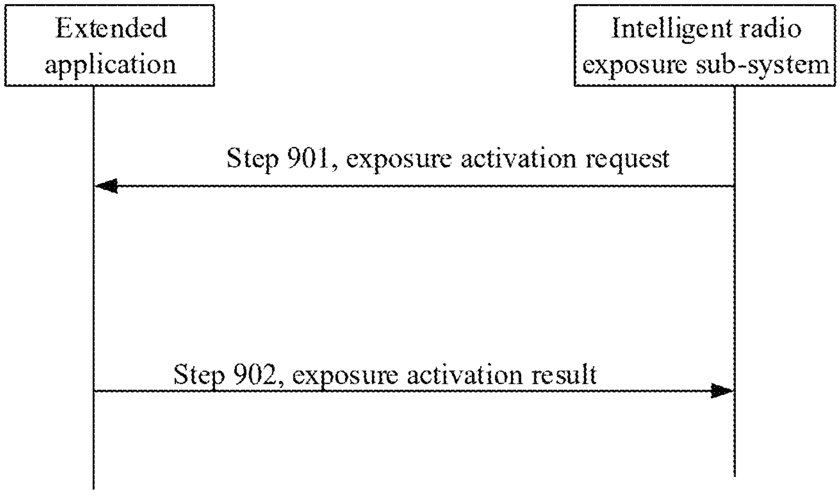
FIG. 9 is a schematic flowchart of an intelligent radio information exposure method provided by the present disclosure.

FIG. 9 is a schematic flowchart of an intelligent radio information exposure method provided by the present disclosure, applied to an extended application. As shown in FIG. 9, the method includes:

step 901, the extended application obtains an exposure activation request sent by an intelligent radio exposure sub-system; and performs processing for the exposure activation request according to current operating information of the extended application itself, to obtain an activation result, where the activation result includes activation success or activation failure, and the operating information includes at least one of the following: startup status information of a corresponding function of the extended application itself, load information produced from startup of the function in the extended application, or integrated extraction constraint information; and step 902: the extended application sends the activation result to the intelligent radio exposure sub-system, to enable the intelligent radio exposure sub-system to establish an intelligent radio information exposure context with the extended application when the activation result is activation success, where the establishing the intelligent radio information exposure context is used to characterize establishment of a connection between the intelligent radio exposure sub-system and the extended application.

In the present disclosure, in order to realize the exposure of intelligent radio information, the intelligent radio exposure sub-system first needs to establish the intelligent radio information exposure context with each extended application. Therefore, the extended application can obtain the exposure activation request sent by the intelligent radio exposure sub-system. In one embodiment, the exposure activation request at least includes an identification of the intelligent radio information exposure context, an identification of intelligent radio information required to be exposed, or required provision timing of intelligent radio information; or, the exposure activation request at least includes at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system; where the identification of the intelligent radio information is at least one in number.

It should be noted that the exposure activation request includes an identification of the intelligent radio information exposure context, an identification of intelligent radio information required to be exposed, or required provision timing of intelligent radio information, and may include information such as a format requirement of the intelligent radio information, or a receiving endpoint of the intelligent radio exposure sub-system.

Accordingly, after obtaining the exposure activation request, each extended application can determine, according to its own current operating information, whether to establish the intelligent radio information exposure context with the intelligent radio exposure sub-system to obtain the activation result. The operating information includes at least one of the following: startup status information of a corresponding function of the extended application itself, load information produced from startup of the function in the extended application, or integrated extraction constraint information.

It should be noted that the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

In one embodiment, the extended application can specifically determine, according to the data carried in the exposure activation request together with synthetical consideration of the startup status or the load of the corresponding function, the integrated extraction constraint, or the like, whether to establish the intelligent radio information exposure context with the intelligent radio exposure sub-system to obtain the activation result. For example, if the extended application is currently in an un-started state, it may refuse to establish the intelligent radio information exposure context with the intelligent radio exposure sub-system. In this case, the activation result may be activation failure.

The extended application can feed the activation result back to the intelligent radio exposure sub-system, and the intelligent radio exposure sub-system can establish, when the activation result is activation success, the intelligent radio information exposure context with the extended application. After the intelligent radio information exposure context is established with the extended application, the intelligent radio information generated by the extended application can be obtained and exposed to an external function through a preset interface.

Accordingly, after the exposure activation request is obtained, the acquisition of intelligent radio information can be realized by adopting a corresponding extraction relationship according to integrated extraction constraint of the extended application itself.

Further, in a case that the activation result is activation failure, the activation result includes failure indication information and/or a reason for the activation failure.

In the present disclosure, when the extended application determines, based on its own operating information, that it is impossible to establish the intelligent radio information exposure context with the intelligent radio exposure sub-system, it can feed the activation result of activation failure back to the intelligent radio exposure sub-system. The activation result may specifically include failure indication information. For example, the failure indication information may specifically be Result-failure. In one embodiment, the activation result of the activation failure may selectively carry the reason for the activation failure.

An embodiment of the exposure activation request message and the exposure activation result message provided by the present disclosure may be shown in Table 1, which will not be elaborated here.

According to the intelligent radio information exposure method provided by the embodiment of the present disclosure, the exposure activation request sent by the intelligent radio exposure sub-system is obtained, processing is performed for the exposure activation request according to current operating information of the extended application itself, and the corresponding activation result is fed back, and the intelligent radio exposure sub-system can establish the intelligent radio information exposure context with the extended application when obtaining the activation result of activation success, and can provide the intelligent radio information generated by the at least one extended application to the external device based on the intelligent radio information exposure context, achieving the exposure of intelligent radio information.

Figure 10:
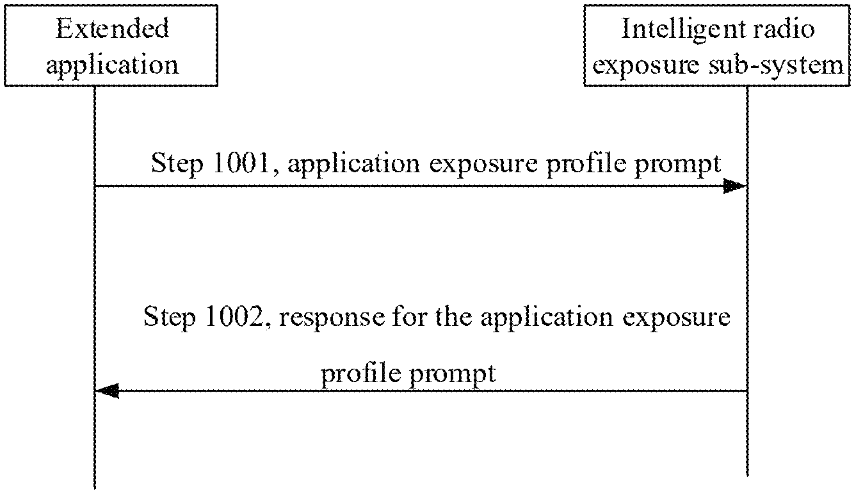
FIG. 10 is a schematic flowchart of an intelligent radio information exposure method provided by the present disclosure.

FIG. 10 is a schematic flowchart of an intelligent radio information exposure method provided by the present disclosure, applied to the extended application. As shown in FIG. 10, before step 901, the method includes the steps as follows.

Step 1001, the extended application sends an application exposure profile to the intelligent radio exposure sub-system, to enable the intelligent radio exposure sub-system to perform a storage operation for the application exposure profile.

Step 1002, the extended application obtains a prompt response message for the application exposure profile sent by the intelligent radio exposure sub-system.

In the present disclosure, in order to enable the intelligent radio exposure sub-system to learn the intelligent radio information that each extended application can provide, each extended application can send the application exposure profile to the intelligent radio exposure sub-system. The application exposure profile at least includes an identification of the extended application, an identification of output information of the extended application, and a format of output information of the extended application; or, the application exposure profile at least includes at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

It should be noted that the application exposure profile at least includes an identification of the extended application, an identification of output information of the extended application, and a format of output information of the extended application, or it may further include an identification of intermediate output information of the extended application, a format of intermediate output information of the extended application, usage status of the extended application, a system requirement of the extended application, and a storage space occupied by the extended application.

Further, each extended application can also obtain the application exposure profile prompt response message of the application exposure profile fed back by the intelligent radio exposure sub-system, and the application exposure profile prompt response message includes a receiving result, for example, the receiving result may indicate that the application exposure profile has been received.

An embodiment of the application exposure profile message and the receiving result message of the application exposure profile provided by the present disclosure may be as shown in Table 2, which will not be elaborated here.

According to the intelligent radio information exposure method provided in the embodiment of the present disclosure, the application exposure profile is sent to the intelligent radio exposure sub-system, and the intelligent radio exposure sub-system can learn the intelligent radio information that each extended application can provide to the external, to provide a basis for the exposure of intelligent radio information.

Figure 11:
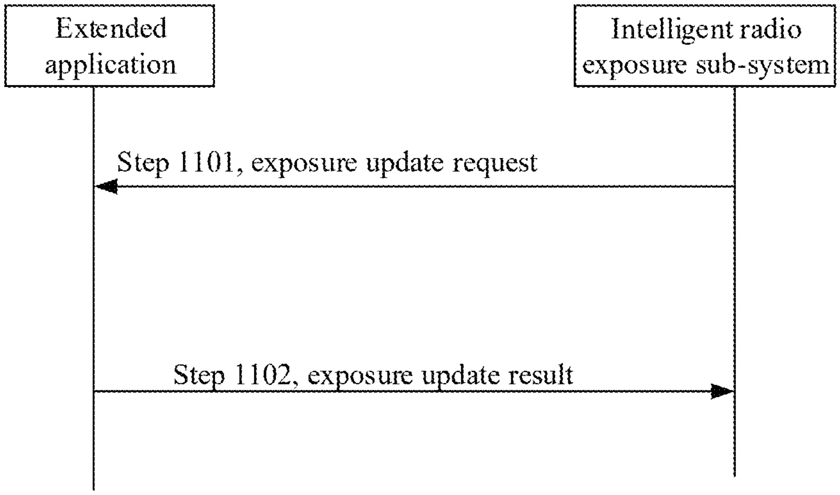
FIG. 11 is a schematic flowchart of an intelligent radio information exposure method provided by the present disclosure.

FIG. 11 is a schematic flowchart of an intelligent radio information exposure method provided by the present disclosure, applied to the extended application. As shown in FIG. 11, the method further includes the following steps.

Step 1101, the extended application obtains an exposure update request sent by the intelligent radio exposure sub-system; and performs, according to current operating information of the extended application itself, processing for the exposure update request to obtain an update result, where the update result includes update success or update failure, and the operating information includes at least one of the following: startup status information of a corresponding function of the extended application itself, load information produced from startup of the function in the extended application, or integrated extraction constraint information.

Step 1102, the extended application sends the update result to the intelligent radio exposure sub-system, to enable the intelligent radio exposure sub-system to update the intelligent radio information exposure context between the intelligent radio exposure sub-system and the extended application when the update result is update success.

In the present disclosure, when the intelligent radio information required by the external function changes, it is necessary to update the intelligent radio information exposure context with the extended application according to updated information. In one embodiment, the exposure update request sent by the intelligent radio exposure sub-system can be obtained, and the exposure update request at least includes an identification of the intelligent radio information exposure context, an updated provision manner of intelligent radio information, or updated provision timing of intelligent radio information; or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system. It should be noted that the exposure update request at least includes an identification of the intelligent radio information exposure context, an updated provision manner of intelligent radio information, or updated provision timing of intelligent radio information. In one embodiment, the exposure update request may further carry the format requirement of the intelligent radio information or the receiving endpoint of the intelligent radio exposure sub-system.

In one embodiment, the updated provision manner of the intelligent radio information may include an updated identification of the intelligent radio information that needs to be provided to the external application, and an updated manner for providing the intelligent radio information.

The updated identification of the intelligent radio information that needs to be provided to the external application may specifically include a newly added identification of intelligent radio information and a deleted identification of intelligent radio information. For example, an identification of intelligent radio information that is not present in the prior-update intelligent radio information exposure context but is present in the updated intelligent radio information exposure context after update is the newly added identification of intelligent radio information; and an identification of intelligent radio information that is present in the prior-update intelligent radio information exposure context but is not present in the updated intelligent radio information exposure context is the deleted identification of intelligent radio information.

The updated manner for providing intelligent radio information may specifically include the updated provision timing of intelligent radio information, and/or the updated format requirement of intelligent radio information, and/or the updated receiving endpoint of the intelligent radio exposure sub-system. Therefore, afterwards, the intelligent radio exposure sub-system can extract the intelligent radio information in accordance with the updated manner for providing intelligent radio information.

Further, the extended application can specifically determine, according to the data carried in the exposure update request together with synthetical consideration of the startup status or the load of the corresponding function, or the integrated extraction constraint information or the like, whether to establish the intelligent radio information exposure context with the intelligent radio exposure sub-system to obtain the update result. For example, if the extended application is currently in an un-started state, it may refuse to establish the intelligent radio information exposure context with the intelligent radio exposure sub-system. In this case, the update result may be update failure.

After the update result is obtained, the update result can be sent to the intelligent radio exposure sub-system, and when the update result is update success, the intelligent radio exposure sub-system updates the intelligent radio information exposure context with the extended application.

It should be noted that the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction.

The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

Further, the update result may also be update failure. In a case that the update result is update failure, the update result includes update failure indication information; or, in a case that the update result is update failure, the update result includes update failure indication information and a reason for the update failure.

It should be noted that, when the update result is update failure, the update result at least includes the update failure indication information. For example, the update failure indication information may specifically be Result-failure. In one embodiment, the update result may further include the reason for the update failure.

An embodiment of the exposure update request message and the exposure update result message provided by the present disclosure may be as shown in Table 3, which will not be elaborated here.

According to the intelligent radio information exposure method provided in the embodiment of the present disclosure, the intelligent radio information exposure context is updated with the intelligent radio exposure sub-system according to the exposure update request, to enable the intelligent radio information exposure context to better conform the requirements in practical applications.

Figure 12:
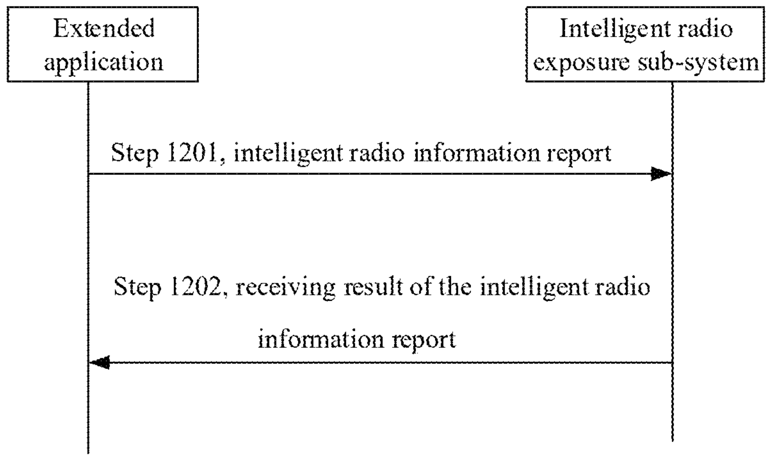
FIG. 12 is a schematic flowchart of an intelligent radio information exposure method provided by the present disclosure.

FIG. 12 is a schematic flowchart of an intelligent radio information exposure method provided by the present disclosure, applied to the extended application. As shown in FIG. 12, when the intelligent radio information exposure context is effectuating, the method further includes:

step 1201, the extended application sends an intelligent radio information report to the intelligent radio exposure sub-system, to enable the intelligent radio exposure sub-system to provide at least one intelligent radio information report corresponding to the extended application to an external function; and step 1202: the extended application obtains a receiving result fed back by the intelligent radio exposure sub-system, where the receiving result is used to characterize that the intelligent radio information report has been received;

where the intelligent radio information report at least includes an identification of the exposure context, an identification of intelligent radio information, reporting timing of intelligent radio information, or content of intelligent radio information; or, the intelligent radio information report at least includes an identification of the exposure context, an identification of intelligent radio information, reporting timing of intelligent radio information, or content of intelligent radio information, and a format of the intelligent radio information.

In the present disclosure, when the intelligent radio exposure sub-system obtains an activation result of activation success or an update result of update success, it characterizes that the intelligent radio information exposure context is effectuating. At that point, the intelligent radio information can be exposed to the external function based on the intelligent radio information exposure context.

In one embodiment, the extended application can send the intelligent radio information report to the intelligent radio exposure sub-system, to enable the intelligent radio exposure sub-system to provide the at least one intelligent radio information report corresponding to the extended application to the external function.

Further, the extended application can also obtain the receiving result of the intelligent radio information report sent by the intelligent radio exposure sub-system, where the receiving result is specifically used to characterize that the intelligent radio information report has been received.

An embodiment of the intelligent radio information report message and the receiving result message for an intelligent radio information report provided by the present disclosure may be shown in Table 4, which will not be elaborated here.

According to the intelligent radio information exposure method provided in the embodiment of the present disclosure, the intelligent radio information report is sent to the intelligent radio exposure sub-system when the intelligent radio information exposure context with the extended application is effectuating, and the intelligent radio exposure sub-system can provide the intelligent radio information report to the external function, thereby achieving the exposure of the intelligent radio information. In addition, the receiving result of the intelligent radio information report sent by the intelligent radio exposure sub-system is obtained, and the transmission result of the intelligent radio information report can be timely learned.

Figure 13:
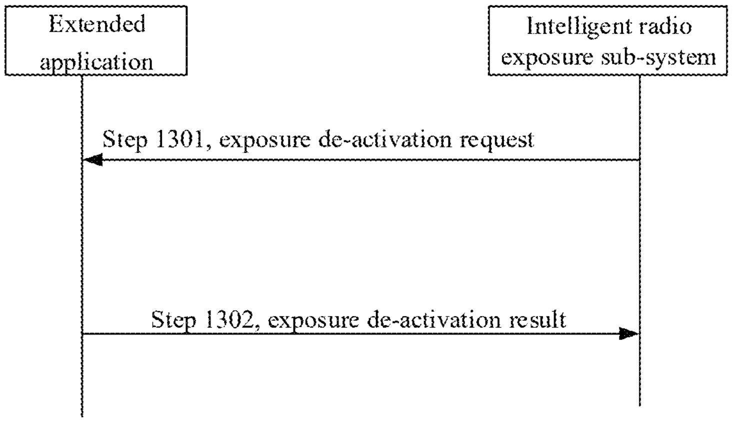
FIG. 13 is a schematic flowchart of an intelligent radio information exposure method provided by the present disclosure.

FIG. 13 is a schematic flowchart of an intelligent radio information exposure method provided by the present disclosure, applied to the extended application. As shown in FIG. 13, the method further includes the following steps.

Step 1301, the extended application obtains an exposure de-activation request sent by the intelligent radio exposure sub-system, where the exposure de-activation request at least includes an identification of the intelligent radio information exposure context; and selects a corresponding function, according to the exposure de-activation request, specifically according to the identification of the intelligent radio information exposure context in the exposure de-activation request, to obtain a selection result.

Step 1302, the extended application sends an intelligent radio information exposure de-activation result to the intelligent radio exposure sub-system according to the selection result, where the intelligent radio information exposure de-activation result includes de-activation success or de-activation failure.

In the present disclosure, the exposure de-activation request may be initiated by the intelligent radio exposure sub-system. Accordingly, the extended application can obtain the exposure de-activation request sent by the intelligent radio exposure sub-system, where the exposure de-activation request at least includes the identification of the exposure context.

After the exposure de-activation request is obtained, the corresponding function can be selected according to the identification of the exposure context in the de-activation request, to obtain the selection result. In one embodiment, in a case that the function selection is successful, the intelligent radio information exposure de-activation result is determined as de-activation success; in a case that the function selection is failed, the intelligent radio information exposure de-activation result is determined as de-activation failure. In a case that the intelligent radio information exposure de-activation result is de-activation failure, the intelligent radio information exposure de-activation result includes de-activation failure indication information, for example, the de-activation failure indication information may specifically be Result-failure. In one embodiment, the intelligent radio information exposure de-activation result includes de-activation failure indication information, and may further include a reason for the de-activation failure.

The embodiment of the exposure de-activation request message and the exposure de-activation result message provided by the present disclosure may be shown in Table 5, which will not be elaborated here.

According to the intelligent radio information exposure method provided by the embodiment of the present disclosure, by sending or receiving the exposure de-activation request, the exposure of the intelligent radio information can be de-activated after exposing the intelligent radio information, ensuring the security of data.

Figure 14:
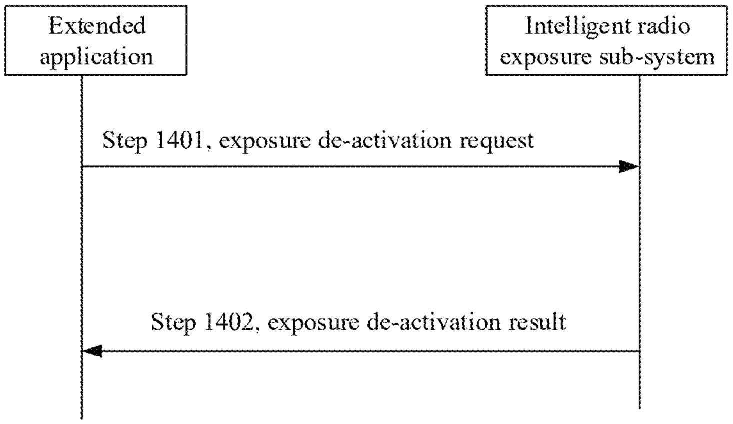
FIG. 14 is a schematic flowchart of an intelligent radio information exposure method provided by the present disclosure.

FIG. 14 is a schematic flowchart of an intelligent radio information exposure method provided by the present disclosure, applied to the extended application. As shown in FIG. 14, the method further includes the following steps.

Step 1401, the extended application sends an exposure de-activation request to the intelligent radio exposure sub-system, where the exposure de-activation request at least includes an identification of the exposure context.

Step 1402, the extended application obtains an intelligent radio information exposure de-activation result fed back by the intelligent radio exposure sub-system; where the intelligent radio information exposure de-activation result includes de-activation success or de-activation failure, and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

In the present disclosure, the exposure de-activation request may also be initiated by the at least one extended application. Accordingly, the intelligent radio exposure sub-system can obtain the exposure de-activation request sent by the at least one extended application, where the exposure de-activation request at least includes the identification of the exposure context.

In one embodiment, after completing the exposure of the intelligent radio information, the intelligent radio exposure sub-system can send the exposure de-activation request to the at least one extended application, where the exposure de-activation request at least includes an identification of the intelligent radio information exposure context.

Accordingly, after obtaining the exposure de-activation request, each extended application can determine, according to the identification of the intelligent radio information exposure context in the exposure de-activation request, whether to de-activate provision of the intelligent radio information; and can obtain the intelligent radio information exposure de-activation result, where the intelligent radio information exposure de-activation result includes de-activation success or de-activation failure.

Accordingly, the extended application can send the intelligent radio information exposure de-activation result to the intelligent radio exposure sub-system. In a case that the intelligent radio information exposure de-activation result is de-activation failure, the intelligent radio information exposure de-activation result includes the de-activation failure indication information, for example, the de-activation failure indication information may specifically be Result-failure. Or, the intelligent radio information exposure de-activation result includes the de-activation failure indication information, and may further include the reason for the de-activation failure.

The embodiment of the exposure de-activation request message and the exposure de-activation result message provided by the present disclosure may be shown in Table 5, which will not be elaborated here.

According to the intelligent radio information exposure method provided by the embodiment of the present disclosure, by sending or receiving the exposure de-activation request, the exposure of the intelligent radio information can be de-activated after exposing the intelligent radio information, ensuring the security of data.

It should be noted that the extended application described in any of the embodiments mentioned above is provided in the near real-time radio access network intelligent controller.

Figure 15:
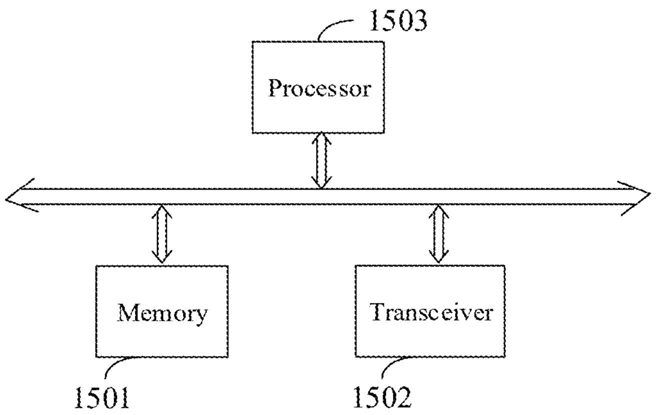
FIG. 15 is a schematic structural diagram of an intelligent radio information exposure apparatus provided by the present disclosure.

FIG. 15 is a schematic structural diagram of an intelligent radio information exposure apparatus provided by the present disclosure, applied to an intelligent radio exposure sub-system, including a memory 1501, a transceiver 1502, and a processor 1503.

The memory 1501 is configured to store a computer program. The transceiver 1502 is configured to send and receive data under the control of the processor. The processor 1503 is configured to read the computer program in the memory and perform the following operations: sending an exposure activation request to at least one extended application; obtaining an activation result fed back by each extended application, where the activation result is determined by the extended application according to current operating information of the extended application itself, the activation result includes activation success or activation failure, and the operating information includes at least one of the following: startup status information of a corresponding function of the extended application itself, load information produced from startup of the function in the extended application, or integrated extraction constraint information; and establishing, when the activation result is activation success, an intelligent radio information exposure context between the intelligent radio exposure sub-system and the extended application, where the establishing the intelligent radio information exposure context is used to characterize establishment of a connection between the intelligent radio exposure sub-system and the extended application.

The transceiver 1502 is configured to receive and send data under the control of the processor 1503.

In FIG. 15, a bus architecture may include any number of interconnected buses and bridges, In one embodiment, various circuits of one or more processors represented by the processor 1503 and the memory represented by the memory 1501 are linked together. The bus architecture may also link together various other circuits such as peripherals, voltage regulators and power management circuits, which are well known in the art and therefore will not be further described herein. A bus interface provides an interface. The transceiver 1502 may be a plurality of elements, i.e., including a transmitter and a receiver, providing units for communicating with various other apparatuses over transmission media including wireless channels, wired channels, fiber optic cables, etc. For different user devices, a user interface may also be an interface capable of connecting externally and internally to required devices, and the connected devices include but are not limited to a keypad, a display, a speaker, a microphone, a joystick, etc. The processor 1503 is responsible for managing the bus architecture and general processing, and the memory 1502 may store data used by the processor 1503 when performing operations.

The processor 1503 may be a central processing unit (CPU), an application specific integrated circuit (ASIC), a field programmable gate array (FPGA) or a complex programmable logic device (CPLD), and the processor may also adopt a multi-core architecture.

The processor is configured to execute any one of the methods provided by the embodiments in FIG. 3 to FIG. 8 of the present disclosure in accordance with the obtained executable instructions by calling the computer program stored in the memory.

Figure 16:
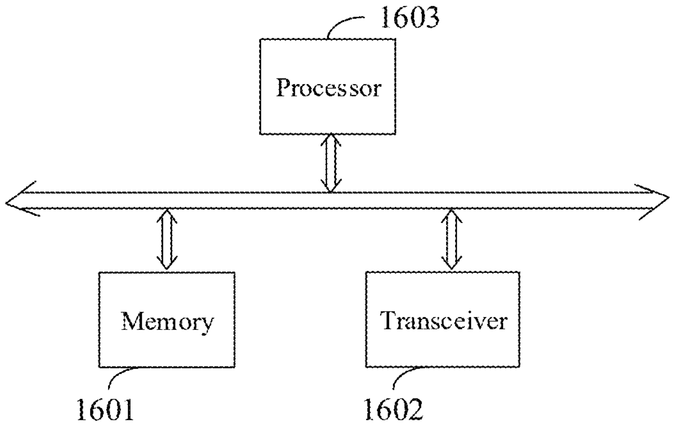
FIG. 16 is a schematic structural diagram of an intelligent radio information exposure apparatus provided by the present disclosure.

FIG. 16 is a schematic structural diagram of an intelligent radio information exposure apparatus provided by the present disclosure, applied to an extended application, including a memory 1601, a transceiver 1602, and a processor 1603.

The memory 1601 is configured to store a computer program. The transceiver 1602 is configured to send and receive data under the control of the processor. The processor 1603 is configured to read the computer program in the memory and perform the following operations: obtaining an exposure activation request sent by an intelligent radio exposure sub-system; performing processing for the exposure activation request according to current operating information of the extended application itself, to obtain an activation result, where the activation result includes activation success or activation failure, and the operating information includes at least one of the following: startup status information of a corresponding function of the extended application itself, load information produced from startup of the function in the extended application, or integrated extraction constraint information; and sending the activation result to the intelligent radio exposure sub-system, to enable the intelligent radio exposure sub-system to establish an intelligent radio information exposure context with the extended application when the activation result is activation success, where the establishing the intelligent radio information exposure context is used to characterize establishment of a connection between the intelligent radio exposure sub-system and the extended application.

The transceiver 1602 is configured to receive and send data under the control of the processor 1603.

In FIG. 16, a bus architecture may include any number of interconnected buses and bridges, In one embodiment, various circuits of one or more processors represented by the processor 1603 and the memory represented by the memory 1601 are linked together. The bus architecture may also link together various other circuits such as peripherals, voltage regulators and power management circuits, which are well known in the art and therefore will not be further described herein. A bus interface provides an interface. The transceiver 1602 may be a plurality of elements, i.e., including a transmitter and a receiver, providing units for communicating with various other apparatuses over transmission media including wireless channels, wired channels, fiber optic cables, etc. For different user devices, a user interface may also be an interface capable of connecting externally and internally to required devices, and the connected devices include but are not limited to a keypad, a display, a speaker, a microphone, a joystick, etc. The processor 1603 is responsible for managing the bus architecture and general processing, and the memory 1602 may store data used by the processor 1603 when performing operations.

The processor 1603 may be a central processing unit (CPU), an application specific integrated circuit (ASIC), a field programmable gate array (FPGA) or a complex programmable logic device (CPLD), and the processor may also adopt a multi-core architecture.

The processor is configured to execute any one of the methods provided by the embodiments in FIG. 9 to FIG. 14 of the present disclosure in accordance with the obtained executable instructions by calling the computer program stored in the memory.

The present disclosure further provides an intelligent radio information exposure apparatus, applied to an intelligent radio exposure sub-system and includes a functional unit for executing the intelligent radio information exposure method as described above. The functional unit may specifically include an obtaining unit, a sending unit and a processing unit.

Figure 17:
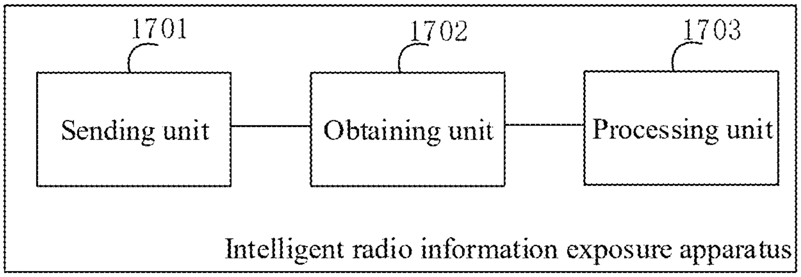
FIG. 17 is a schematic structural diagram of an intelligent radio information exposure apparatus provided by the present disclosure.

FIG. 17 is a schematic structural diagram of an intelligent radio information exposure apparatus provided by the present disclosure, applied to an intelligent radio exposure sub-system. As shown in FIG. 17, the apparatus includes: a sending unit 1701, an obtaining unit 1702, and a processing unit 1703. The sending unit 1701 is configured to send an exposure activation request to at least one extended application. The obtaining unit 1702 is configured to obtain an activation result fed back by each extended application, where the activation result is determined by the extended application according to current operating information of the extended application itself, the activation result includes activation success or activation failure, and the operating information includes at least one of the following: startup status information of a corresponding function of the extended application itself, load information produced from startup of the function in the extended application, or integrated extraction constraint information. The processing unit 1703 is configured to establish, when the activation result is activation success, an intelligent radio information exposure context between the intelligent radio exposure sub-system and the extended application, where the establishing the intelligent radio information exposure context is used to characterize establishment of a connection between the intelligent radio exposure sub-system and the extended application.

Further, the exposure activation request at least includes an identification of the intelligent radio information exposure context, an identification of intelligent radio information required to be exposed, or required provision timing of intelligent radio information; or, the exposure activation request at least includes at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system; where the identification of the intelligent radio information is at least one in number.

Further, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction. The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

Further, in a case that the activation result is activation failure, the activation result includes failure indication information and/or a reason for the activation failure.

Further, the obtaining unit 1702 is configured to obtain an application exposure profile sent by each extended application; the processing unit 1703 is configured to perform a storage operation for the application exposure profile sent by each extended application.

Further, the processing unit 1703 is configured to: for each extended application, if it is detected that there is a stored exposure profile corresponding to the extended application, use the obtained application exposure profile to overwrite the stored exposure profile.

Further, the application exposure profile at least includes an identification of the extended application, an identification of output information of the extended application, and a format of output information of the extended application; or, the application exposure profile at least includes at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

Further, the sending unit 1701 is configured to send an exposure update request to the at least one extended application; the obtaining unit 1702 is configured to obtain an update result fed back by each extended application, where the update result is determined by the extended application according to current operating information of the extended application itself, the update result includes update success or update failure, and the operating information includes at least one of the following: startup status information of a corresponding function of the extended application itself, load information produced from startup of the function in the extended application, or integrated extraction constraint information; the processing unit 1703 is configured to update the intelligent radio information exposure context between the intelligent radio exposure sub-system and the extended application when the update result is update success.

Further, the exposure update request at least includes an identification of the intelligent radio information exposure context, an updated provision manner of intelligent radio information, or updated provision timing of intelligent radio information; or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system; where the identification of the intelligent radio information is at least one in number.

Further, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction. The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

Further, in a case that the update result is update failure, the update result includes update failure indication information; or, in a case that the update result is update failure, the update result includes update failure indication information and a reason for the update failure.

Further, the processing unit 1703 is configured to: perform incremental modification expression according to the exposure update request and on a basis of a currently effectuating intelligent radio information exposure context, or perform, according to the exposure update request, full expression in a manner of fully prompting the intelligent radio information exposure context.

Further, the sending unit 1701 is further configured to send an exposure de-activation request to the at least one extended application, where the exposure de-activation request at least includes an identification of the intelligent radio information exposure context; the obtaining unit 1702 is further configured to obtain an intelligent radio information exposure de-activation result fed back by the at least one extended application, where the intelligent radio information exposure de-activation result includes de-activation success or de-activation failure; and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

Further, the obtaining unit 1702 is further configured to obtain an exposure de-activation request sent by the at least one extended application, where the exposure de-activation request at least includes an identification of the intelligent radio information exposure context; the processing unit 1703 is configured to select a corresponding function according to the exposure de-activation request, specifically according to the identification of the exposure context in the de-activation request, to obtain a selection result; the sending unit 1701 is further configured to send, according to the selection result, an intelligent radio information exposure de-activation result to the at least one extended application, where the intelligent radio information exposure de-activation result includes de-activation success or de-activation failure.

Further, the sending unit 1701 is configured to: determine, in a case of a successful function selection, that the intelligent radio information exposure de-activation result is de-activation success; determine, in a case of a failed function selection, that the intelligent radio information exposure de-activation result is de-activation failure; where in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

Further, in a case that the intelligent radio information exposure context is effectuating, the obtaining unit 1702 is further configured to receive at least one corresponding intelligent radio information report provided by the extended application; where the intelligent radio information report at least includes an identification of the intelligent radio information exposure context, an identification of intelligent radio information, reporting timing of intelligent radio information, or content of intelligent radio information; or, the intelligent radio information report at least includes an identification of the intelligent radio information exposure context, an identification of intelligent radio information, reporting timing of intelligent radio information, or content of intelligent radio information, and a format of the intelligent radio information; the processing unit 1703 is configured to provide an external function with the at least one intelligent radio information report corresponding to the extended application.

Further, the sending unit 1701 is further configured to send a receiving result to the at least one extended application, where the receiving result is used to characterize that the intelligent radio information report has been received.

The present disclosure further provides an intelligent radio information exposure apparatus, applied to an extended application, including a functional unit configured for executing the intelligent radio information exposure method, where the functional unit specifically includes a data obtaining unit, a data sending unit, and a data processing unit.

Figure 18:
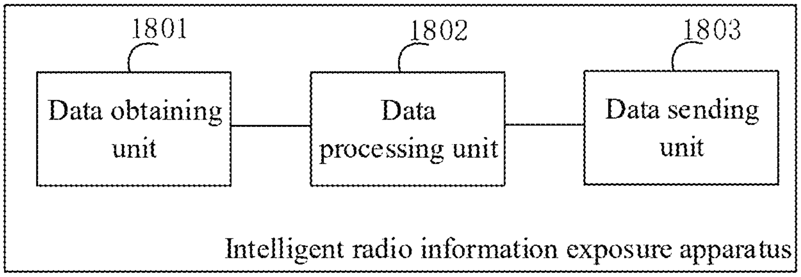
FIG. 18 is a schematic structural diagram of an intelligent radio information exposure apparatus provided by the present disclosure.

FIG. 18 is a schematic structural diagram of an intelligent radio information exposure apparatus provided by the present disclosure, applied to the extended application. As shown in FIG. 18, the apparatus includes: a data obtaining unit 1801, a data processing unit 1802, and a data sending unit 1803. The data obtaining unit 1801 is configured to obtain an exposure activation request sent by an intelligent radio exposure sub-system; the data processing unit 1802 is configured to perform processing for the exposure activation request according to current operating information of the extended application itself, to obtain an activation result, where the activation result includes activation success or activation failure, and the operating information includes at least one of the following: startup status information of a corresponding function of the extended application itself, load information produced from startup of the function in the extended application, or integrated extraction constraint information; the data sending unit 1803 is configured to send the activation result to the intelligent radio exposure sub-system, to enable the intelligent radio exposure sub-system to establish an intelligent radio information exposure context with the extended application when the activation result is activation success, where the establishing the intelligent radio information exposure context is used to characterize establishment of a connection between the intelligent radio exposure sub-system and the extended application.

Further, the exposure activation request at least includes an identification of the intelligent radio information exposure context, an identification of intelligent radio information required to be exposed, or required provision timing of intelligent radio information; or, the exposure activation request at least includes at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system; where the identification of the intelligent radio information is at least one in number.

Further, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction. The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

Further, the data processing unit 1802 is configured to perform according to the integrated extraction constraint information, when the identification of the intelligent radio information is plural in number, an extraction operation for intelligent radio information corresponding to the identification of the intelligent radio information being plural in number.

Further, in a case that the activation result is activation failure, the activation result includes failure indication information and/or a reason for the activation failure.

Further, the data sending unit 1803 is configured to send an application exposure profile to the intelligent radio exposure sub-system, to enable the intelligent radio exposure sub-system to perform a storage operation for the application exposure profile.

Further, the application exposure profile at least includes an identification of the extended application, an identification of output information of the extended application, and a format of output information of the extended application; or, the application exposure profile at least includes at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

Further, the data obtaining unit 1801 is configured to obtain an exposure update request sent by the intelligent radio exposure sub-system; the data processing unit 1802 is configured to perform processing for the exposure update request according to current operating information of the extended application itself, to obtain an update result, where the update result includes update success or update failure, and the operating information includes at least one of the following: startup status information of a corresponding function of the extended application itself, load information produced from startup of the function in the extended application, or integrated extraction constraint information; the data sending unit 1803 is further configured to send the update result to the intelligent radio exposure sub-system, to enable the intelligent radio exposure sub-system to update the intelligent radio information exposure context between the intelligent radio exposure sub-system and the extended application when the update result is update success.

Further, the exposure update request at least includes an identification of the intelligent radio information exposure context, an updated provision manner of intelligent radio information, or updated provision timing of intelligent radio information; or, the exposure update request at least includes at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system; where the identification of the intelligent radio information is at least one in number.

Further, the integrated extraction constraint information is used to characterize that when the identification of the intelligent radio information is plural in number, an information extraction operation is performed among a plurality of pieces of intelligent radio information by adopting any extraction relationship out of integrated extraction, independent extraction, or partially integrated extraction. The integrated extraction is used to characterize that all pieces of intelligent radio information are provided synchronously, and when any piece of intelligent radio information cannot be provided, the extraction is not valid; the independent extraction is used to characterize that all pieces of intelligent radio information are provided separately, and when any piece of intelligent radio information cannot be provided, the extraction of other information would not be affected; the partially integrated extraction is used to characterize a situation including both integrated extraction and independent extraction.

Further, in a case that the update result is update failure, the update result includes update failure indication information; or, in a case that the update result is update failure, the update result includes update failure indication information and a reason for the update failure.

Further, the data obtaining unit 1801 is configured to obtain an exposure de-activation request sent by the intelligent radio exposure sub-system, where the exposure de-activation request at least includes an identification of the intelligent radio information exposure context; the data processing unit 1802 is configured to select a corresponding function, according to the exposure de-activation request, specifically according to the identification of the intelligent radio information exposure context in the exposure de-activation request, to obtain a selection result; the data sending unit 1803 is further configured to send an intelligent radio information exposure de-activation result to the intelligent radio exposure sub-system according to the selection result, where the intelligent radio information exposure de-activation result includes de-activation success or de-activation failure.

Further, the data processing unit 1802 is configured to: determine, in a case of a successful function selection, that the intelligent radio information exposure de-activation result is de-activation success; determine, in a case of a failed function selection, that the intelligent radio information exposure de-activation result is de-activation failure; where in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

Further, the data sending unit 1803 is further configured to send an exposure de-activation request to the intelligent radio exposure sub-system, where the exposure de-activation request at least includes an identification of the intelligent radio information exposure context; the data obtaining unit 1801 is configured to obtain an intelligent radio information exposure de-activation result fed back by the intelligent radio exposure sub-system; where the intelligent radio information exposure de-activation result includes de-activation success or de-activation failure, and in a case that the intelligent radio information exposure de-activation result is de-activation failure, the intelligent radio information exposure de-activation result includes de-activation failure indication information, or the intelligent radio information exposure de-activation result includes de-activation failure indication information and a reason for the de-activation failure.

Further, in a case that the intelligent radio information exposure context is effectuating, the data sending unit 1803 is further configured to send an intelligent radio information report to the intelligent radio exposure sub-system, to enable the intelligent radio exposure sub-system to provide at least one intelligent radio information report corresponding to the extended application to an external function; the data obtaining unit 1801 is configured to obtain a receiving result fed back by the intelligent radio exposure sub-system, where the receiving result is used to characterize that the intelligent radio information report has been received; and the intelligent radio information report at least includes an identification of the intelligent radio information exposure context, an identification of intelligent radio information, reporting timing of intelligent radio information, or content of intelligent radio information; or, the intelligent radio information report at least includes an identification of the intelligent radio information exposure context, an identification of intelligent radio information, reporting timing of intelligent radio information, or content of intelligent radio information, and a format of the intelligent radio information.

The methods and the apparatuses corresponding thereto are based on the same application concept. Since the methods and the apparatuses corresponding thereto solve the problem with similar principles, reference can be made to each other for the implementation of the apparatuses and the methods corresponding thereto, and the repetition will not be elaborated.

The embodiments of the present disclosure may be applied to a variety of systems, especially 5G systems. For example, the applied system may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, an universal mobile telecommunication system (UMTS), a worldwide interoperability for microwave access (WiMAX) system, a 5G new radio (NR) system, etc. These various systems all include terminal devices and network devices. These systems may also include a core network portion such as an Evolved Packet System (EPS), a 5G system (5GS), etc.

Another embodiment of the present disclosure further provides a processor-readable storage medium storing a computer program, and the computer program is used to enable a processor to execute the method according to any of the embodiments mentioned above.

Another further embodiment of the present disclosure provides a near real-time radio access network intelligent controller which includes the intelligent radio exposure sub-system according to any of the embodiments mentioned above.

It should be noted here that the apparatuses provided by the present disclosure are capable of implementing all the method steps implemented in the method embodiments and are capable of achieving the same effect. The parts and beneficial effects of this embodiment which are same as those in the method embodiments will not be described in detail here.

It should be noted that the division of units in the embodiments of the present disclosure is illustrative and is merely a logical function division, and there may be other division manners in practical implementations. In addition, the functional units in the embodiments of the present disclosure may be integrated in a single processing unit, or each unit may be physically present separately, or two or more units may be integrated in a single unit. The above integrated units may be implemented either in the form of hardware or in the form of software functional units.

The integrated units may be stored in a processor-readable storage medium if implemented in the form of software function units and sold or used as an independent product. Based on such understanding, a solution of the present disclosure in essence, or the part of the solution which makes a contribution to the prior art, or all or part of the solution may be embodied in the form of a software product. The computer software product is stored in a storage medium, including several instructions for causing a computer device (which may be a personal computer, a server, or a network device, etc.) or a processor to execute all or part of the steps of the methods in the various embodiments of the present application. The aforementioned storage medium includes various media that can store program codes, such as a U disk, a mobile hard disk, a read-only memory (ROM), a random access memory (RAM), a magnetic disk or an optical disk.

It should be noted here that the apparatuses provided by the present disclosure are capable of implementing all the method steps implemented in the method embodiments and are capable of achieving the same effect. The parts and beneficial effects of this embodiment which are same as those in the method embodiments will not be described in detail here.

The processor-readable storage medium may be any available medium or data storage device that can be accessed by a processor, including but not limited to a magnetic storage (such as a floppy disk, a hard disk, a magnetic tape, a magneto-optical disk (MO), etc.), an optical storage (such as a CD, a DVD, a BD, an HVD, etc.), and a semiconductor storage (such as a ROM, an EPROM, an EEPROM, a non-volatile memory (NAND FLASH), a solid state disk (SSD)), etc.

The embodiments of the present disclosure may be provided as methods, systems, or computer program products. Accordingly, the present disclosure may take the form of an entirely hardware embodiment, an entirely software embodiment or an embodiment combining software and hardware aspects. Also, the present disclosure may take the form of a computer program product embodied on one or more computer-usable storage media (including but not limited to a disk storage and an optical storage, etc.) containing computer-usable program codes therein.

The present disclosure is described with reference to flowcharts and/or block diagrams of methods, devices (systems), and computer program products according to the embodiments of the present disclosure. It should be understood that each procedure and/or block in the flowcharts and/or block diagrams, and combinations of procedures and/or blocks in the flowcharts and/or block diagrams may be implemented by the computer-executable instructions. These computer-executable instructions may be provided to a processor of a general-purpose computer, a special-purpose computer, an embedded processor, or other programmable data processing devices to produce a machine, and an apparatus for implementing a function specified in one or more procedures of the flowcharts and/or one or more blocks of the block diagrams may be produced via the instructions executed by the processor of the computer or other programmable data processing devices.

These processor-executable instructions may also be stored in a processor-readable memory capable of directing a computer or other programmable data processing devices to operate in a specific manner, and the instructions stored in the processor-readable memory produce a manufacturing product including an instruction apparatus, where the instruction apparatus implements the function specified in one or more procedures of the flow charts and/or one or more blocks of the block diagrams.

These processor-executable instructions may also be loaded onto a computer or other programmable data processing devices, and a series of operational steps are performed on the computer or other programmable devices to produce computer-implemented processing. Therefore, the instructions executed on the computer or other programmable devices provide steps for implementing the functions specified in one or more procedures of the flowcharts and/or one or more blocks of the block diagrams.

Various changes and modifications to the present disclosure without departing from the spirit and scope of the present disclosure. In this fashion, if these changes and modifications of the present disclosure fall within the scope of the claims of the present disclosure and their equivalent technologies, the present disclosure is also intended to include these modifications and variations.

The invention claimed is:

1. An intelligent radio information exposure method, applied to an intelligent radio exposure sub-system, comprising:

- sending an exposure activation request to at least one extended application;
- obtaining an activation result fed back by each extended application, wherein the activation result is determined by the extended application according to current operating information of the extended application itself;
- establishing an intelligent radio information exposure context between the intelligent radio exposure sub-system and the extended application in a case that the activation result is activation success, wherein the establishing the intelligent radio information exposure context comprises establishing a connection between the intelligent radio exposure sub-system and the extended application.

2. The method according to claim 1, wherein the operating information comprises at least one of the following: startup status information of a corresponding function of the extended application itself, load information produced from startup of the function in the extended application, or integrated extraction constraint information;

- the exposure activation request at least comprises at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system;
- wherein the identification of the intelligent radio information is at least one in number.

3. The method according to claim 1, before sending the exposure activation request to the at least one extended application, further comprising:

obtaining an application exposure profile sent by each extended application; and performing a storage operation for the application exposure profile sent by each extended application;

wherein the performing the storage operation for the application exposure profile sent by each extended application comprises:

for each extended application, using, if it is detected that there is a stored application exposure profile corresponding to the extended application, the obtained application exposure profile to overwrite the stored application exposure profile.

4. The method according to claim 3, wherein the application exposure profile at least comprises at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

5. The method according to claim 1, further comprising:

sending an exposure update request to the at least one extended application; wherein the exposure update request at least comprises at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system;

obtaining an update result fed back by each extended application, wherein the update result is determined by the extended application according to current operating information of the extended application itself, and the operating information comprises at least one of the following: startup status information of a corresponding function of the extended application itself, load information produced from startup of the function in the extended application, or integrated extraction constraint information;

updating the intelligent radio information exposure context between the intelligent radio exposure sub-system and the extended application in a case that the update result is update success.

6. The method according to claim 1, further comprising:

sending an exposure de-activation request to the at least one extended application, wherein the exposure de-activation request at least comprises an identification of the intelligent radio information exposure context;

obtaining an intelligent radio information exposure de-activation result fed back by the at least one extended application, wherein the intelligent radio information exposure de-activation result comprises de-activation success or de-activation failure; and in a case that the intelligent radio information exposure de-activation result is de-activation failure, the intelligent radio information exposure de-activation result comprises de-activation failure indication information, or the intelligent radio information exposure de-activation result comprises de-activation failure indication information and a reason for the de-activation failure.

7. The method according to claim 1, further comprising:

obtaining an exposure de-activation request sent by the at least one extended application, wherein the exposure de-activation request at least comprises an identification of the intelligent radio information exposure context;

selecting a corresponding function according to the identification of the intelligent radio information exposure context in the de-activation request; and sending an intelligent radio information exposure de-activation result to the at least one extended application; wherein in a case that the intelligent radio information exposure de-activation result is de-activation failure, the intelligent radio information exposure de-activation result comprises de-activation failure indication information, or the intelligent radio information exposure de-activation result comprises de-activation failure indication information and a reason for the de-activation failure.

8. The method according to claim 1, further comprising:

receiving at least one corresponding intelligent radio information report provided by the extended application in a case that the intelligent radio information exposure context is effectuating;

providing an external function with the at least one intelligent radio information report corresponding to the extended application;

wherein the intelligent radio information report at least comprises an identification of the intelligent radio information exposure context, an identification of intelligent radio information, reporting timing of intelligent radio information, or content of intelligent radio information;

or, the intelligent radio information report at least comprises a format of intelligent radio information and at least one of an identification of the intelligent radio information exposure context, an identification of intelligent radio information, reporting timing of intelligent radio information, or content of intelligent radio information.

9. An intelligent radio information exposure method, applied to an extended application, comprising:

obtaining an exposure activation request sent by an intelligent radio exposure sub-system;

performing processing for the exposure activation request according to current operating information of the extended application itself, to obtain an activation result, wherein the activation result comprises activation success or activation failure;

sending the activation result to the intelligent radio exposure sub-system, to enable the intelligent radio exposure sub-system to establish an intelligent radio information exposure context with the extended application when the activation result is activation success, wherein the establishing the intelligent radio information exposure context is used to characterize establishment of a connection between the intelligent radio exposure sub-system and the extended application.

10. The method according to claim 9, wherein the operating information comprises at least one of the following: startup status information of a corresponding function of the extended application itself, load information produced from startup of the function in the extended application, or integrated extraction constraint information;

the exposure activation request at least comprises at least one of the following items: an identification of the intelligent radio information exposure context, an identification of intelligent radio information required to be exposed, required provision timing of intelligent radio information, a format requirement of the intelligent radio information, and a receiving endpoint of the intelligent radio exposure sub-system;

wherein the identification of the intelligent radio information is at least one in number.

11. The method according to claim 9, before obtaining the exposure activation request sent by the intelligent radio exposure sub-system, further comprising:

sending an application exposure profile to the intelligent radio exposure sub-system, to enable the intelligent radio exposure sub-system to perform a storage operation for the application exposure profile.

12. The method according to claim 11, wherein the application exposure profile at least comprises at least one of the following items: an identification of the extended application, an identification of output information of the extended application, a format of output information of the extended application, an identification of intermediate output information of the extended application, a format of intermediate output information of the extended application, usage status of the extended application, a system requirement of the extended application, and a storage space occupied by the extended application.

13. The method according to claim 9, further comprising:

obtaining an exposure update request sent by the intelligent radio exposure sub-system; wherein the exposure update request at least comprises at least one of the following items: an identification of the intelligent radio information exposure context, an updated provision manner of intelligent radio information, updated provision timing of intelligent radio information, a format requirement of the intelligent radio information, and a receiving endpoint of the intelligent radio exposure sub-system;

performing processing for the exposure update request according to current operating information of the extended application itself, to obtain an update result, wherein the update result comprises update success or update failure, and the operating information comprises at least one of the following: startup status information of a corresponding function of the extended application itself, load information produced from startup of the function in the extended application, or integrated extraction constraint information;

sending the update result to the intelligent radio exposure sub-system, to enable the intelligent radio exposure sub-system to update the intelligent radio information exposure context between the intelligent radio exposure sub-system and the extended application in a case that the update result is update success.

14. The method according to claim 9, further comprising:

obtaining an exposure de-activation request sent by the intelligent radio exposure sub-system, wherein the exposure de-activation request at least comprises an identification of the intelligent radio information exposure context;

selecting a corresponding function according to the identification of the intelligent radio information exposure context in the exposure de-activation request to obtain a selection result;

sending an intelligent radio information exposure de-activation result to the intelligent radio exposure sub-system according to the selection result, wherein the intelligent radio information exposure de-activation result comprises de-activation success or de-activation failure.

15. The method according to claim 14, wherein the selecting the corresponding function according to the identification of the intelligent radio information exposure context in the exposure de-activation request to obtain the selection result comprises:

determining, in a case of a successful function selection, that the intelligent radio information exposure de-activation result is de-activation success;

determining, in a case of a failed function selection, that the intelligent radio information exposure de-activation result is de-activation failure, wherein in a case that the intelligent radio information exposure de-activation result is de-activation failure, the intelligent radio information exposure de-activation result comprises de-activation failure indication information, or the intelligent radio information exposure de-activation result comprises de-activation failure indication information and a reason for the de-activation failure.

16. The method according to claim 9, further comprising:

sending an exposure de-activation request to the intelligent radio exposure sub-system, wherein the exposure de-activation request at least comprises an identification of the intelligent radio information exposure context;

obtaining an intelligent radio information exposure de-activation result fed back by the intelligent radio exposure sub-system; in a case that the intelligent radio information exposure de-activation result is de-activation failure, the intelligent radio information exposure de-activation result comprises de-activation failure indication information, or the intelligent radio information exposure de-activation result comprises de-activation failure indication information and a reason for the de-activation failure.

17. The method according to claim 16, wherein in a case that the intelligent radio information exposure context is effectuating, the method further comprises:

sending an intelligent radio information report to the intelligent radio exposure sub-system, to enable the intelligent radio exposure sub-system to provide at least one intelligent radio information report corresponding to the extended application to an external function;

obtaining a receiving result fed back by the intelligent radio exposure sub-system, wherein the receiving result is used to characterize that the intelligent radio information report has been received;

wherein the intelligent radio information report at least comprises an identification of the intelligent radio information exposure context, an identification of intelligent radio information, reporting timing of intelligent radio information, or content of intelligent radio information;

or, the intelligent radio information report at least comprises a format of the intelligent radio information and at least one of an identification of the intelligent radio information exposure context, an identification of intelligent radio information, reporting timing of intelligent radio information, or content of intelligent radio information.

18. An intelligent radio information exposure apparatus, applied to an intelligent radio exposure sub-system, comprising a memory, a transceiver, and a processor:

wherein the memory is configured to store a computer program; the transceiver is configured to transmit and receive data under control of the processor; and the processor is configured to read the computer program in the memory and execute following operations:

sending an exposure activation request to at least one extended application;

obtaining an activation result fed back by each extended application, wherein the activation result is determined by the extended application according to current operating information of the extended application itself;

establishing an intelligent radio information exposure context between the intelligent radio exposure sub-system and the extended application in a case that the activation result is activation success, wherein the establishing the intelligent radio information exposure context comprises establishing a connection between the intelligent radio exposure sub-system and the extended application.

19. An intelligent radio information exposure apparatus, applied to an extended application, comprising a memory, a transceiver, and a processor:

wherein the memory is configured to store a computer program; the transceiver is configured to transmit and receive data under control of the processor; and the processor is configured to read the computer program in the memory and execute the method according to claim 9.

20. A processor-readable storage medium stored with a computer program, wherein the computer program is used to enable a processor to execute the method according to claim 1.

* * * * *